(12) United States Patent
Leonard

(10) Patent No.: US 11,148,579 B2
(45) Date of Patent: Oct. 19, 2021

(54) AERODYNAMIC VEHICLE STRUCTURES WITH AIR SCOOP LIGHT UNIT

(71) Applicant: Creative Worx LLC, Noblesville, IN (US)

(72) Inventor: Joshua R. Leonard, Noblesville, IN (US)

(*) Notice: Subject to any disclaimer, the term of this patent is extended or adjusted under 35 U.S.C. 154(b) by 9 days.

(21) Appl. No.: 16/507,964

(22) Filed: Jul. 10, 2019

(65) Prior Publication Data

US 2019/0329698 A1    Oct. 31, 2019

Related U.S. Application Data

(63) Continuation of application No. PCT/US2018/012978, filed on Jan. 9, 2018.

(60) Provisional application No. 62/444,785, filed on Jan. 10, 2017.

(51) Int. Cl.
| | | |
|---|---|---|
| *B60Q 1/04* | (2006.01) | |
| *B60Q 1/26* | (2006.01) | |
| *B62D 35/00* | (2006.01) | |
| *B62D 37/02* | (2006.01) | |
| *B60Q 1/02* | (2006.01) | |

(52) U.S. Cl.
CPC ......... *B60Q 1/0483* (2013.01); *B60Q 1/2661* (2013.01); *B62D 35/005* (2013.01); *B62D 35/007* (2013.01); *B62D 37/02* (2013.01)

(58) Field of Classification Search
CPC ............ F21V 29/60; F21S 45/45; F21S 45/47
See application file for complete search history.

(56) References Cited

U.S. PATENT DOCUMENTS

| | | | |
|---|---|---|---|
| 3,635,517 A | 1/1972 | Wilfert et al. | |
| 4,838,603 A | 6/1989 | Masoero et al. | |
| 10,107,468 B2 * | 10/2018 | Scervo | B62D 37/02 |
| 10,179,614 B2 * | 1/2019 | Nakamura | B62D 37/02 |
| 2005/0122730 A1 * | 6/2005 | Wong | B60Q 1/0035 |
| | | | 362/485 |

(Continued)

FOREIGN PATENT DOCUMENTS

| | | |
|---|---|---|
| DE | G8326550.3 | 9/1983 |
| DE | WO2010/101007 | 1/2012 |

OTHER PUBLICATIONS

L. Jiang et al, Effect of Automotive Headlamp Modeling on Automotive Aerodynamic Drag, 2008 9th International Conference on Computer-Aided Industrial Design and Conceptual Design, Published Nov. 1, 2008, Last Update Feb. 26, 2010, Pertinent pp. 588-593 (Year: 2010).*

*Primary Examiner* — Keith G. Delahoussaye
(74) *Attorney, Agent, or Firm* — Taylor IP, P.C.

(57) ABSTRACT

An air scoop light unit for a vehicle includes a light emitting area and related features where the light unit comprises a concave guiding surface spaced apart from the vehicle body to form an airflow channel there between that guides airflow at least partially around an outer side corner of the vehicle body to enhance aerodynamic efficiency. The air scoop light unit may incorporate safety features such as sensing devices as well as features that allow the air scoop light unit to deform, break or move in a predetermined manner such as to absorb energy in case of contact with an object such as a pedestrian. Vehicles including one or more such lamp assemblies are also included, including vehicles having tapered bodies.

15 Claims, 20 Drawing Sheets

(56) References Cited

U.S. PATENT DOCUMENTS

2012/0126574 A1\* 5/2012 Komiya ............... B60Q 1/0017
296/181.5

\* cited by examiner

AERODYNAMIC VEHICLE STRUCTURES WITH AIR SCOOP LIGHT UNIT

CROSS REFERENCE TO RELATED APPLICATIONS

This is a continuation of PCT application no. PCT/US2018/012978 entitled "AERODYNAMIC VEHICLE STRUCTURES," filed Jan. 9, 2018, which is incorporated herein by reference. PCT application no. PCT/US2018/012978 claims the benefit of U.S. provisional application No. 62/444,785 entitled "AERODYNAMIC VEHICLE STRUCTURES", filed Jan. 10, 2017, which is incorporated herein by reference.

BACKGROUND OF THE INVENTION

1. Field of the Invention

The present invention relates to vehicles, such as cars, trucks, trailers, and the like, and more particularly to structures that may be applied to or incorporated with the bodies of vehicles for improving their aerodynamics.

2. Description of the Related Art

Vehicles may be generally propelled through a fluid, such as air, which flows around the body of the vehicle as it moves. The flow moving around the vehicle body typically causes a net drag force resisting the motion of the vehicle. The drag force is proportional to the frontal area which is the area of the vehicle projected onto a lateral plane that is a virtual vertical reference plane transverse to the direction of flow. The drag force is also proportional to a factor known as the drag coefficient, which is a function of the shape of the vehicle and other factors. It is often desirable to reduce the frontal area, drag coefficient, or both to reduce the amount of energy required to move a vehicle through a fluid to improve its energy efficiency at a given speed, or to increase the maximize speed capability of a given vehicle.

Various aerodynamic features have been developed to affect the airflow around vehicles. For example, small wing-like structures called canards may be sometimes added to certain areas of racing vehicles to direct airflow. Road vehicles may use spoilers, fairings, skirting or vortex generators to affect airflow. In other cases, portions of the airflow may be directed through flow intake and extractor ducts through areas of the vehicle requiring convection cooling, such as braking components, powertrain components or heat exchangers associated with the powertrain or cabin cooling systems.

Commercial, transit, and recreational vehicles may be used to transport goods and people, and to provide mobile living space. To maximize their functional capacities, such vehicles may have increased length, width, and height dimensions up to the limits allowed by law. This often leads to vehicles such as buses, trains, motorhomes, delivery vehicles, and semi-tractor trailers having large box-like shapes. Consequently, these vehicles typically have large frontal areas and squared-off body shapes that are often susceptible to undesirable flow separation and turbulence caused by sharp pressure changes in the airflow around the vehicle, which collectively generate high drag coefficients and high drag forces, causing correspondingly-high rates of energy consumption and operating costs. Accordingly, there has long been a strong economic motivation to improve the aerodynamic properties of such vehicles.

There is also a desire to improve safety for both vehicle operators and pedestrians. Aerodynamic features that reduce air turbulence not only improve vehicle efficiency, but may also reduce road spray generated by turbulent airflows stirring up precipitation or water on roadways. Such turbulence tends to deposit dirt and residue on vehicle surfaces, including windows and lamp areas, which may obstruct visibility.

While many vehicles would benefit from the addition of aerodynamic features to improve airflow around the vehicle and reduce drag, such features are often not adopted because of additional manufacturing cost, complexity, weight, and other factors. For example, known aerodynamic features may inhibit, obstruct, or otherwise interfere with the use of necessary functions such as lamp visibility, mirror visibility, door access, or violate operating parameters such as turning clearance or maximum preferred or legal vehicle dimensions.

What is needed in the art is improved ways to enhance the aerodynamics of vehicles.

SUMMARY OF THE INVENTION

The present invention(s) elegantly overcome many of the drawbacks of prior systems and provide numerous additional improvements and benefits as will be apparent to persons of skill in the art. Since most vehicles require headlights, taillights, turn signal lights, and other lamp assemblies, the present inventor has developed various designs that utilize lamp assemblies in new ways that address various issues and disadvantages of known vehicle designs, and otherwise advance the art of vehicle design. Structures and vehicles incorporating various aspects of the non-limiting examples described herein may provide any or all of enhanced aerodynamic performance, improved illumination, reduced weight, improved visibility, enhanced safety, improved aesthetics, simplified construction, and decreased cost of manufacture and operation, for instance by integrating illumination, aerodynamic, safety, and other functions in the design of vehicle lamp assemblies.

In various example embodiments, an air scoop light unit may comprise an light emitting area, a lens area and a housing body that may be dimensioned for mounting to the associated vehicle such that a concave guiding surface of the air scoop light unit may be in spaced relation to a portion of the body of the associated vehicle and at least partially defines a flow channel. When exposed to a relative flow of fluid, a portion of the relative flow may be guided by the concave guiding surface from a leading edge and progress toward a trailing edge and may turn through a guiding angle there between. The leading edge may be associated with a first flow geometry and the trailing edge may be associated with a second flow geometry. Differences in the first and second flow geometries may reduce aerodynamic drag to improve the efficiency of an associated vehicle and reduce turbulence that may diminish visibility. The air scoop light unit may optionally incorporate safety features such as sensing devices as well as features that allow the air scoop light unit to deform, break or move in a predetermined manner such as to absorb energy in case of contact with an object such as a pedestrian.

A vehicle in accordance with the present novel concept may be provided for use with one or more associated lamp assemblies which provide illumination for the vehicle and when exposed to a relative flow of fluid, have the capability of guiding a portion of the relative flow of fluid. Any exemplary air scoop light unit has a concave guiding surface in spaced relation to a portion of the body of the vehicle and at least partially defines a flow channel. In typical operation, the portion of the relative flow may be guided by the concave guiding surface from a leading edge and progress toward a trailing edge and may turn through a guiding angle there between. The leading edge may be associated with a first flow geometry and a first body surface, whereas the trailing edge may be associated with a second flow geometry and a second body surface. Differences in the first and second flow geometries may reduce aerodynamic drag to improve vehicle efficiency and reduce turbulence that may diminish visibility. The vehicle may optionally incorporate safety features into any exemplary lamp assemblies such as sensing devices as well as features that allow said air scoop light unit to deform, break or move in a predetermined manner such as to absorb energy in case of contact with an object such as a pedestrian.

Thus, the subject matter of this present disclosure involves the integration of aerodynamic features and safety features into air scoop light unit and vehicle designs, whereas lamp assemblies in some form must already be present on most vehicles to be compliant with governing laws. Furthermore, it may not be desirable to apply aerodynamic or safety products to certain areas of a vehicle that would block or obscure conventional lamp assemblies or otherwise compete for mounting space. Consequently, aerodynamic performance and safety may be often compromised. Therefore, aerodynamic performance and safety benefits may be incorporated into exemplary air scoop light unit and vehicle designs disclosed herein without sacrificing illumination requirements and with minimal impact to weight and manufacturing costs while also expanding illumination, aesthetic and operational options. In one example embodiment depicted in FIG. 2, exemplary lamp assemblies may be located in a vertical location in proximity to the maximum center of pressure of the vehicle when moving through a fluid. An example embodiment for use with a vehicle rear end is shown in FIG. 9 where the vehicle tapers towards its rear most extremity and exemplary lamp assemblies do not protrude beyond the maximum width of the vehicle body such as to remain out of view of mirror members. This tapering of the profile of the width of the vehicle body may be carried through to the front end of the vehicle as well.

For example, provided in various example embodiments is an air scoop light unit for a vehicle body comprising four exterior convex corner portions including a front left corner portion, a front right corner portion, a rear left corner portion, and a rear right corner portion, the air scoop light unit comprising: a curved body comprising a concave curved inner surface contoured to extend at least partially around one of the four exterior convex corner portions of the vehicle body; a first connector portion configured to connect the concave curved inner surface with said one of the four exterior convex corner portions of the vehicle body so as to hold the curved body in a location spaced apart from said one of the four exterior convex corner portions of the vehicle body such that a curved airflow channel is formed between said one of the four exterior convex corner portions of the vehicle body and the concave curved inner surface, which curved airflow channel is configured to guide airflow around said one of the four exterior convex corner portions of the vehicle body when the air scoop light unit is attached with the vehicle body and the vehicle body moves through air during use; the curved body further comprising a first light emitting area configured to direct light from a first light source.

In various example embodiments an air scoop light unit may further comprise a second connector portion configured to connect the concave curved inner surface with said one of the four exterior convex corner portions of the vehicle body so as to hold the curved body in a location spaced apart from said one of the four exterior convex corner portions of the vehicle body by a first distance such that a curved airflow channel is formed between said one of the four exterior convex corner portions of the vehicle body and the concave curved inner surface, which curved airflow channel is configured to guide airflow around said one of the four exterior convex corner portions of the vehicle body when the air scoop light unit is attached with the vehicle body and the vehicle body moves through air during use.

In various example embodiments the curved body may extend in the vertical direction, when installed on the vehicle body, from an upper portion to a lower portion, and the first connector portion may be configured to connect an upper portion of the concave curved inner surface with said one of the four exterior convex corner portions of the vehicle body and the second connector portion is configured to connect a lower portion of the concave curved inner surface with said one of the four exterior convex corner portions of the vehicle body, such that the first and second connector portions are configured to form upper and lower walls, respectively, of the curved airflow channel that is formed between said one of the four exterior convex corner portions of the vehicle body and the concave curved inner surface when the air scoop light unit is installed on the vehicle body.

In various example embodiments the curved body may be a unitary structure that comprises the first and second connector portions. In various example embodiments the curved body may be formed at least in part (or entirely or substantially entirely) from translucent material. In various example embodiments the first light source may be housed within the curved body. In various example embodiments the first light source may be mounted with the curved body, such as mounted onto the curved body, for instance. In various example embodiments the first light source may comprise a vehicle taillight, vehicle headlight, vehicle turn signal light, or any combination thereof. In various example embodiments the first light emitting area may be positioned to direct light toward at least a portion of the vehicle. In various example embodiments the curved body may further comprise a second light emitting area configured to direct light from a second light source housed within the curved body.

Also provided in various example embodiments is a vehicle comprising a vehicle body having four exterior convex corner portions including a front left corner portion, a front right corner portion, a rear left corner portion, and a rear right corner portion, the vehicle body comprising a first air scoop light unit as described herein attached with a first one of the four exterior convex corner portions of the vehicle body such that a curved airflow channel is formed between said first one of the four exterior convex corner portions of the vehicle body and the concave curved inner surface of the first air scoop light unit, which curved airflow channel is configured to guide airflow around said first one of the four exterior convex corner portions of the vehicle body when the vehicle body moves through air during operation of the vehicle.

In various example embodiments the vehicle body may further comprise a second air scoop light unit as described herein, attached with a second one of the four exterior convex corner portions of the vehicle body such that a curved airflow channel is formed between said second one of the four exterior convex corner portions of the vehicle body and the concave curved inner surface of the second air scoop light unit, which curved airflow channel is configured to guide airflow around said second one of the four exterior convex corner portions of the vehicle body when the vehicle body moves through air during operation of the vehicle.

In various example embodiments the vehicle body may further comprise a third air scoop light unit as described herein attached with a third one of the four exterior convex corner portions of the vehicle body such that a curved airflow channel is formed between said third one of the four exterior convex corner portions of the vehicle body and the concave curved inner surface of the third air scoop light unit, which curved airflow channel is configured to guide airflow around said third one of the four exterior convex corner portions of the vehicle body when the vehicle body moves through air during operation of the vehicle.

In various example embodiments the vehicle body further comprising a fourth air scoop light unit as described herein attached with a fourth one of the four exterior convex corner portions of the vehicle body such that a curved airflow channel is formed between said fourth one of the four exterior convex corner portions of the vehicle body and the concave curved inner surface of the fourth air scoop light unit, which curved airflow channel is configured to guide airflow around said fourth one of the four exterior convex corner portions of the vehicle body when the vehicle body moves through air during operation of the vehicle.

In various example embodiments said first one of the four exterior convex corner portions of the vehicle body is the rear left corner portion and said second one of the four exterior convex corner portions of the vehicle body is the rear right corner portion. In various example embodiments said first one of the four exterior convex corner portions of the vehicle body is the front left corner portion and said second one of the four exterior convex corner portions of the vehicle body is the front right corner portion.

In various example embodiments the first connector portion may be configured to connect the concave curved inner surface with said one of the four exterior convex corner portions of the vehicle body so as to hold the curved body in a location spaced apart from said one of the four exterior convex corner portions of the vehicle body by a first distance; and the vehicle body may comprise an exterior profile that extends longitudinally from a front region comprising the front left corner portion and the front right corner portion, to a central body portion having a first cross-sectional width, to a rear portion comprising the rear left corner portion and the rear right corner portion, wherein the vehicle body tapers inward as it extends away from the central portion such that the rear portion has a second cross-sectional width that is narrower than the first cross-sectional width by an amount equal to at least twice the first distance.

The subject matter of the present disclosure may find particular application and use in conjunction with wheeled vehicles moving through air, and will be shown and described herein with reference thereto. However, it will be appreciated that the subject matter of the present disclosure may be also amenable to other applications and environments, and that the specific uses shown and described herein are merely exemplary. For example, the subject matter of the present disclosure could be used in connection with powered or non-powered vehicles and wheeled or non-wheeled vehicles operating within air or other fluids. Accordingly, the subject matter of the present disclosure is not intended to be limited to just uses associated with wheeled vehicles operating in air.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Reference is made herein to some specific examples embodying the present invention, including any best modes contemplated by the inventor for carrying out the invention. Examples of these specific embodiments are illustrated in the accompanying Figures. While examples of the invention are described in conjunction with these specific embodiments, it will be understood that this description is not intended to limit the invention to the described or illustrated embodiments. To the contrary, this description is intended to cover alternatives, modifications, and equivalents as may be included within the spirit and scope of the invention as defined by the appended claims.

In the following description, numerous specific details are set forth in order to provide a thorough understanding of the example embodiments. Particular example embodiments may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of any methods shown and described herein are not necessarily performed in the order indicated, or performed at all in certain embodiments. Accordingly, some implementations of methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
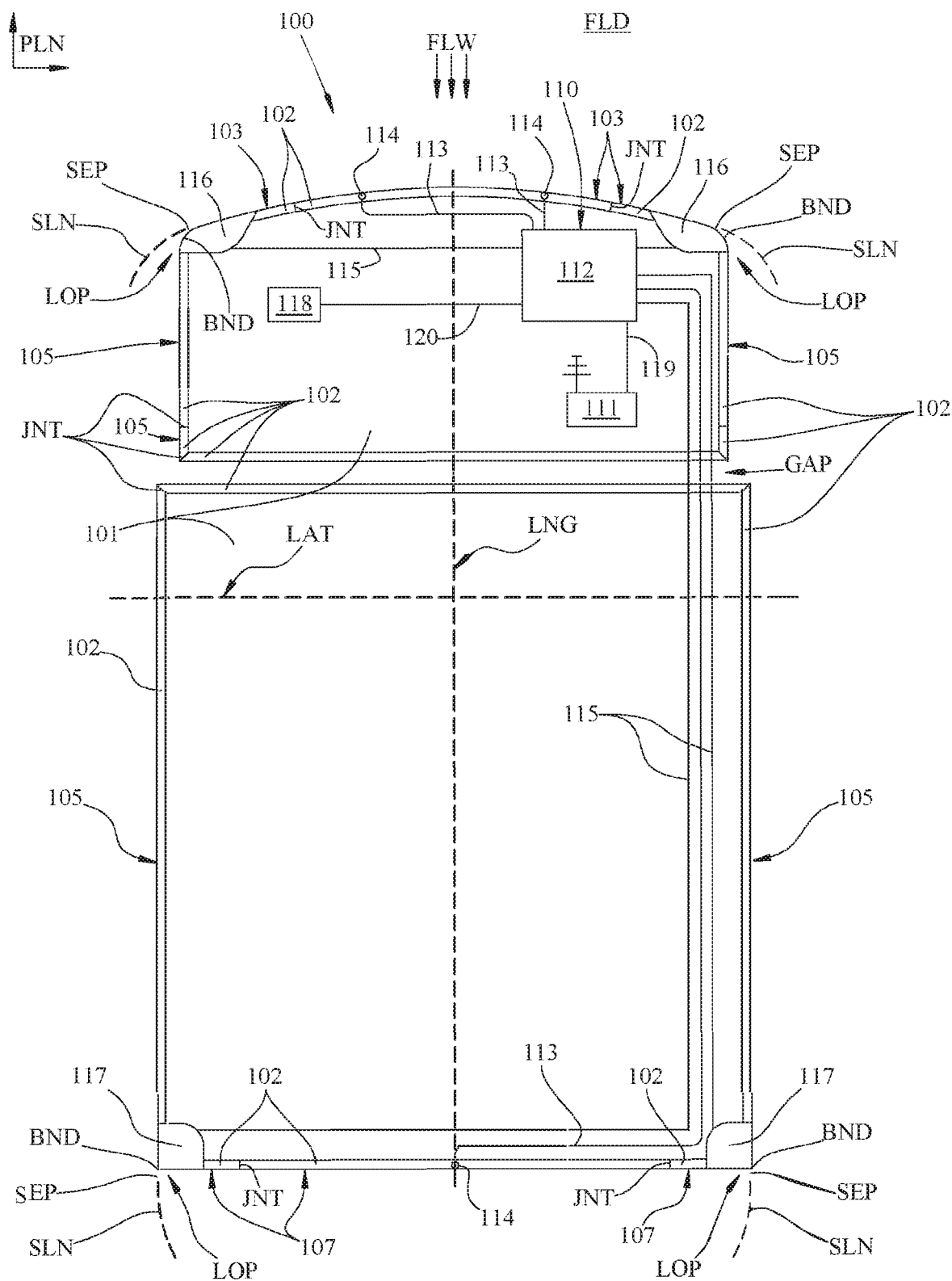
FIG. 1 is a schematic representation of a cross-section through a horizontal reference plane of one example of a vehicle moving through a fluid, such as air, with a relative flow.

FIG. 1 illustrates a schematic cross-sectional view of vehicle 100 through horizontal reference plane PLN, whereas vehicle 100 may be a conventional vehicle having body 101 consisting of a plurality of body members 102. In some cases, adjacent body members 102 may be in relatively close proximity or touching at joint JNT, but in other cases gap GAP exists such that surfaces of body members may be generally non-continuous. Vehicle 100 may be capable of moving through fluid FLD generating relative flow FLW. Longitudinal plane LNG may be a virtual vertical reference plane intersecting the front, rear and approximate longitudinal centerline of vehicle 100 and generally tangential to relative flow FLW when generated. Lateral plane LAT may be a virtual vertical reference plane perpendicular to longitudinal plane LNG and generally transverse to relative flow FLW when generated. Both longitudinal plane LNG and lateral plane LAT may be perpendicular to horizontal reference plane PLN. Throughout the Figures, LAT is shown cutting a cross-section through an example central body portion of a vehicle. When front body surface 103 is projected on lateral plane LAT, its projected area may be greater than when front body surface 103 is projected on longitudinal plane LNG. When side body surface 105 is projected on longitudinal plane LNG, its projected area may be greater than when side body surface 105 is projected on lateral plane LAT. When rear body surface 107 is projected on lateral plane LAT, its projected area may be greater than when rear body surface 107 is projected on longitudinal plane LNG. Front, side, and rear body surfaces 103, 105 and 107 may be demarcated by boundary BND whereas said surfaces may each comprise one or more body members 102 in part or in whole or share portions thereof.

With respect to FIG. 1, the relative flow FLW may flow around exterior convex corner portions BND of the vehicle body, such as a front left corner portion, a front right corner portion, a rear left corner portion, or a rear right corner portion. For purposes of this disclosure, the term "convex" broadly means a surface or surfaces that together are, at least in part, either curving outward or extending outward regardless of the presence or absence of rounded curvature. Accordingly, "convex" includes square-edge corners, such as 90-degree corners, by way of example and not limitation. In various example embodiments the relative flow FLW may move from front body surface 103 to alongside body surface 105 to rear body surface 107. Relative flow FLW may follow streamline SLN which may separate or otherwise increase its distance from body 101 at region SEP which may create adjacent low pressure areas LOP that may be proportional to aerodynamic drag. Certain example designs disclosed herein seek to reduce aerodynamic drag by guiding portions of flow FLW in manners that limit, reduce, or otherwise utilize separation regions SEP and related low pressure areas LOP.

Vehicle 100 also may include at least one control system such as control system 110 which may include an energy source 111 such as a battery, generator, compressor or any other energy source, to supply energy to control system 110 through lead 119. Control system 110 also may include control unit 112 and communication leads 113, 115 and 120 for communicating signals such as electric, optic, pneumatic or any other signals or combinations thereof, to other components such as sensing devices 114 for example being one of a camera or proximity sensor, lamp assemblies 116 and 117 and operator controls 118, respectively. Control system 110 may be capable of communication with any one or more systems and components (not shown) on vehicle 100 such as but not limited to those pertaining to lighting, headlight levelling, displays, instrumentation, safety, security, braking, vehicle speed control, detection, data logging, communication and the like.

Figure 2:
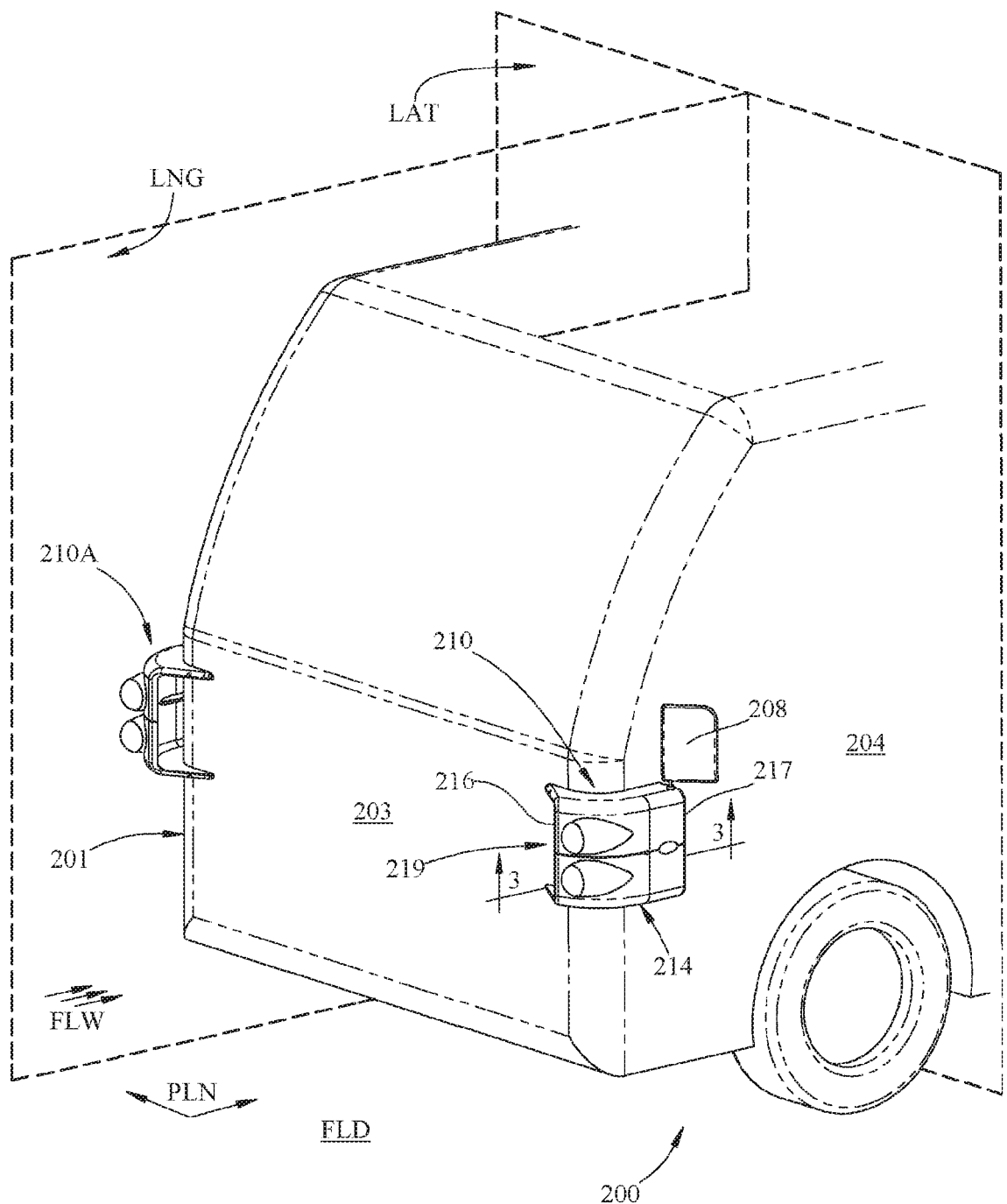
FIG. 2 is a perspective view of a portion of one example of a vehicle having an air scoop light unit in accordance with the subject matter of the present disclosure.
Figure 3:
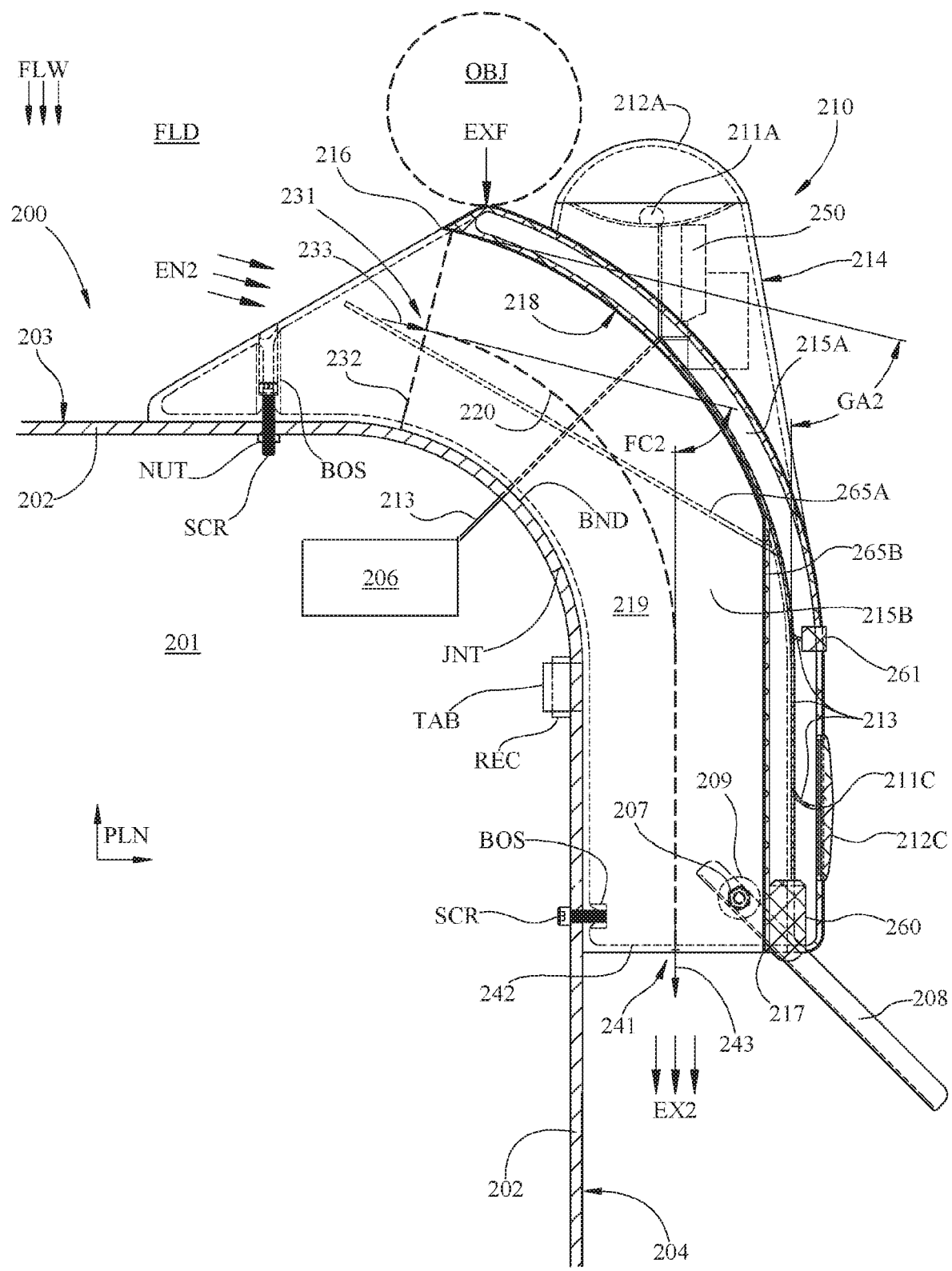
FIG. 3 is a sectional view of the air scoop light unit mounted on the vehicle shown in FIG. 2 taken along section 3-3 therein.

In one example, FIGS. 2 and 3 illustrate vehicle 200 having body 201 consisting of a plurality of body members 202. Vehicle 200 may be capable of moving through fluid FLD, generating relative flow FLW. Longitudinal plane LNG may be a virtual vertical reference plane intersecting the front, rear and approximate longitudinal centerline of vehicle 200 and generally tangential to relative flow FLW when generated. Lateral plane LAT may be a virtual vertical reference plane perpendicular to longitudinal plane LNG and generally transverse to relative flow FLW when generated. Both longitudinal plane LNG and lateral plane LAT may be perpendicular to horizontal reference plane PLN.

Relative flow FLW may move from first body surface 203, for example being a front body surface to second body surface 204, for example being a side body surface. When first body surface 203 is projected on lateral plane LAT, its projected area may be greater than when first body surface 203 is projected on longitudinal plane LNG. When second body surface 204 is projected on longitudinal plane LNG, its projected area may be greater than when second body surface 204 is projected on lateral plane LAT. First body surface 203 and second body surface 204 may each comprise one or more body members 202 in part or in whole or share portions thereof. First body surface 203 and second body surface 204 may be substantially not co-planar with one another. Air scoop light unit 210 may be located in proximity to first body surface 203 and second body surface 204, for example on a front corner of vehicle 200 in a similar manner as air scoop light unit 116 on vehicle 100 of FIG. 1. Complimentary air scoop light unit 210A may reside on the complimentary corner of the same end of vehicle 200.

Figure 4:
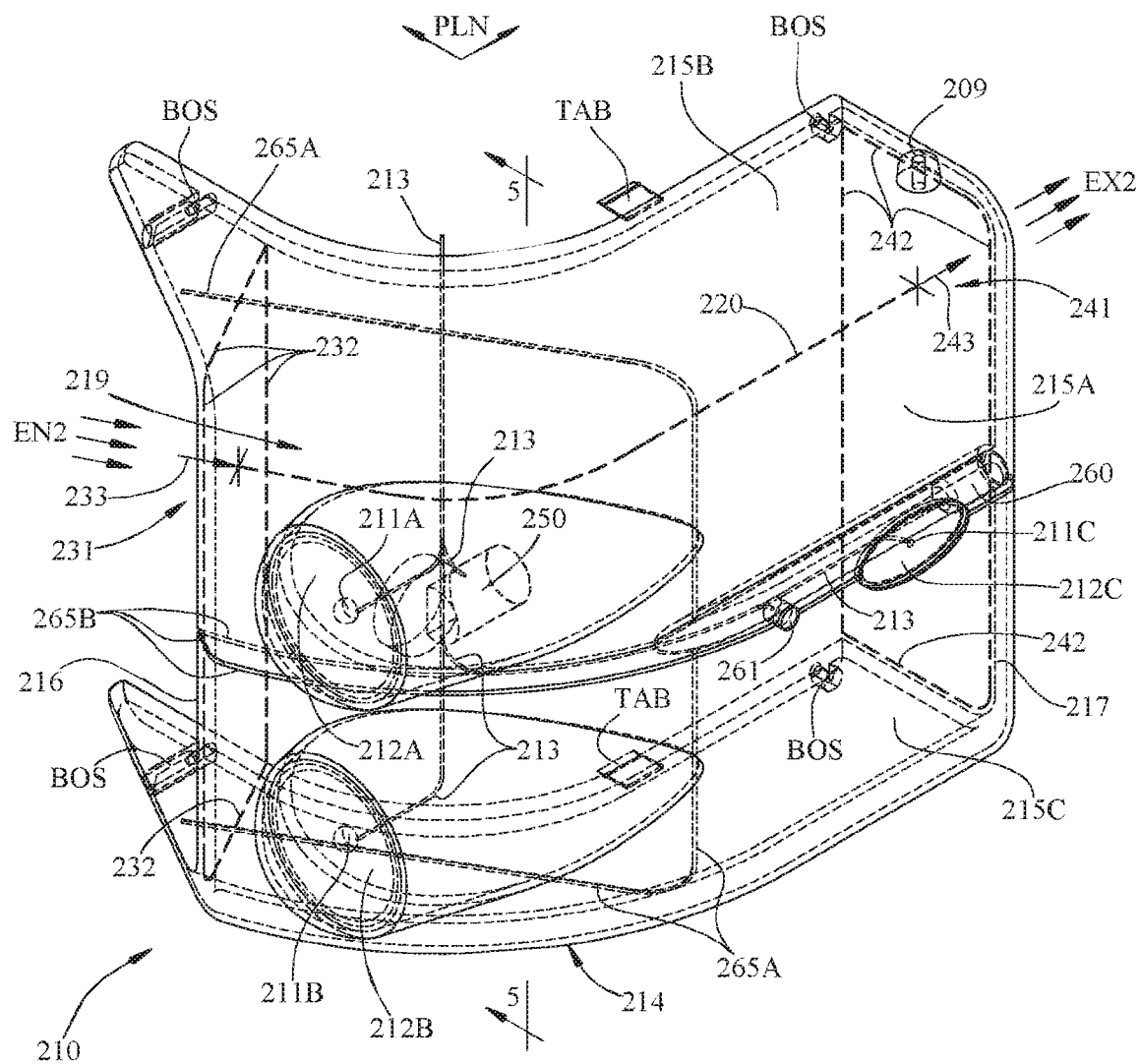
FIG. 4 is a perspective view of an exemplary air scoop light unit from FIG. 2 in accordance with the subject matter of the present disclosure.
Figure 5A:
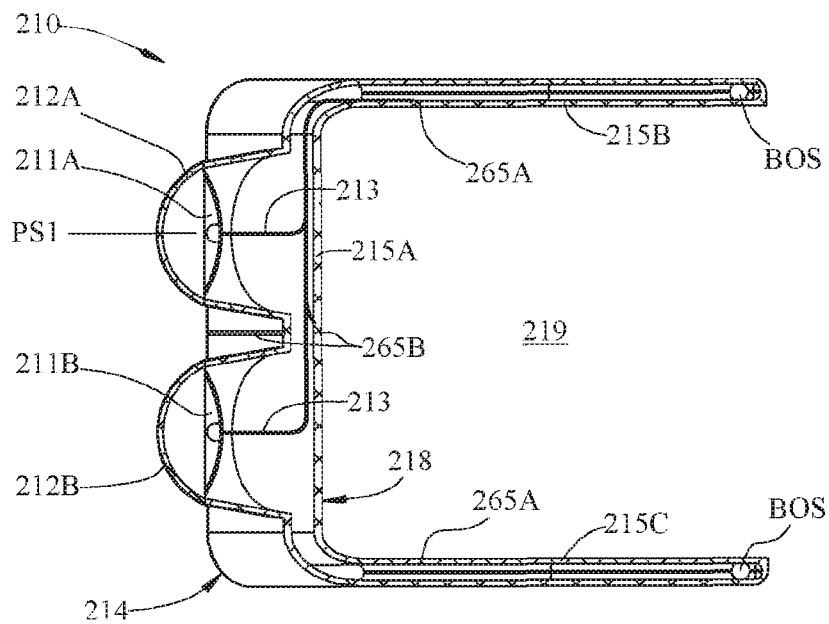
FIG. 5A is a sectional view of the air scoop light unit shown in FIG. 4 taken along section 5-5 therein depicting one position.
Figure 5B:
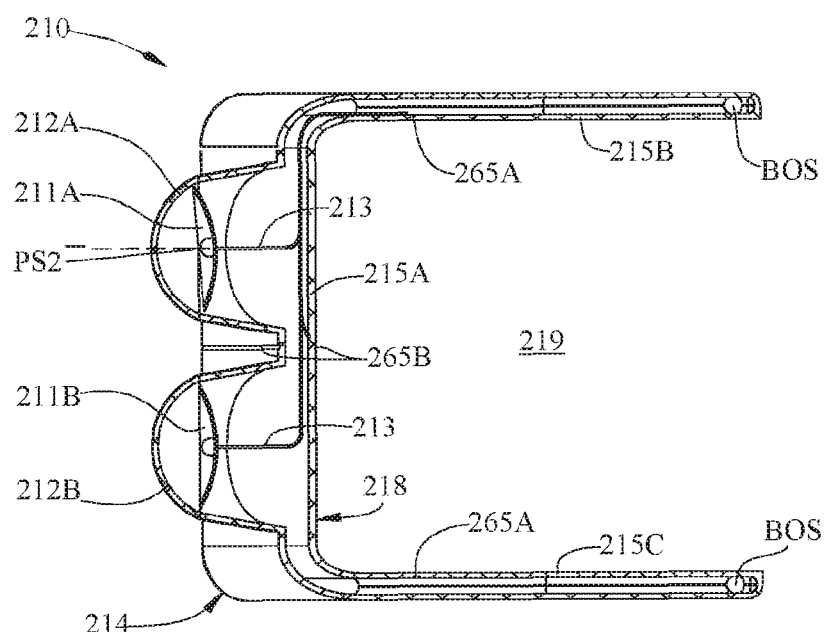
FIG. 5B is a sectional view of the air scoop light unit shown in FIG. 4 taken along section 5-5 therein depicting another position.

As further indicated in FIGS. 4, 5A and 5B, air scoop light unit 210 may include light emitting areas 211A, 211B and 211C, lens areas 212A, 212B and 212C, communication lead 213 and housing body 214. Air scoop light unit 210 also may include leading edge 216 and trailing edge 217 with concave guiding surface 218 there between in spaced relation to vehicle body 201. Concave guiding surface 218 may guide an entrant flow EN2 as it turns through guiding angle GA2 having at least a component thereof in horizontal reference plane PLN, whereas concave guiding surface 218 may at least partially define flow channel 219 having flow path 220. Housing body 214 may be dimensioned for securement to vehicle 200 and may comprise housing portions 215A, 215B and 215C, and housing portion 215A may include concave guiding surface 218 which approximates an offset profile of a portion of body 201. Housing portions 215B and 215C may extend from housing portion 215A towards body 201. For purposes of this disclosure, the term "concave" broadly means a surface or surfaces that together are, at least in part, either curved inward or hollowed inward, regardless of the presence or absence of rounded curvature. Accordingly, a "concave" surface or surfaces may include square-edge corners, such as 90-degree corners, by way of example and not limitation.

FIG. 3 illustrates air scoop light unit 210 mounted to vehicle 200 with screws SCR, nuts NUT, snap tabs TAB, bosses BOS and receptacles REC as non-limiting examples of attachment methods. Air scoop light unit 210 optionally mounts mirror member 208 to mirror mount 209 such as with nut 207.

First body surface 203 may be associated with leading edge 216, entrant flow EN2 and first flow geometry 231, whereas entrant flow EN2 may be a portion of relative flow FLW and first flow geometry 231 may comprise first flow area 232 and first flow direction 233. Boundary BND of body surface 203 may lie on flow channel 219. Second body surface 204 may be associated with trailing edge 217, exit flow EX2 and second flow geometry 241, whereas exit flow EX2 may include a portion of a form of entrant flow EN2 and second flow geometry 241 may comprise second flow area 242 and second flow direction 243. First flow direction 233 approximates the direction of concave guiding surface 218 in proximity to leading edge 216 while second flow direction 243 approximates the direction of concave guiding surface 218 in proximity to trailing edge 217 at their respective cross-section locations. Second flow direction 243 may be different from first flow direction 233 resulting in flow change angle FC2 having at least a component thereof in horizontal reference plane PLN, whereas flow change angle FC2 approximates guiding angle GA2. Furthermore, guiding angle GA2 may be consistent or varied at different cross-section locations depending on the application. In the arrangement shown in this exemplary embodiment, guiding angle GA2 may be consistent and may be between 50 and 80 degrees, for example, depending on the magnitude of relative flow FLW for the application.

Furthermore, air scoop light unit 210 may include force generating member 250 such as an actuator which may be capable of moving at least a portion of any light emitting area, such as light emitting area 211A between positions PS1 and PS2 as shown in FIGS. 5A and 5B such for the purpose of one of leveling, aiming, focusing or augmenting the light emitted. Additionally, air scoop light unit 210 may include sensing devices, for example being a camera 260 and detection sensor 261. Light emitting areas 211A, 211B and 211C, force generating member 250, camera 260 and detection sensor 261 may be for example connected to communication lead 213 for communication with control system 206, but could have separate communication leads or connect to different or additional control systems.

Light emitting areas 211A, 211B and 211C may comprise components for illumination known by those skilled in the art such as light sources, reflectors, shields and diffusers. Light sources may include, for example, incandescent lamps, light-emitting-diodes (LEDs), xenon lamps, high-intensity-discharge (HID) lamps, optic conductors or any suitable type. Reflectors may include, for example, polished or plated metal stampings or injection molded plastic components with reflective coatings or any suitable construction or material as may the shields and diffusers.

For example, light emitting areas 211A and 211B may include at least one light source that may be operatively steady when illuminated such as, but not limited to a headlight, marker lamp, driving lamp, fog lamp or spot lamp. For example, light emitting area 211C may include at least one light source that may be operatively regulated such as, but not limited to a turn signal lamp, hazard lamp or emergency lamp. Functions such as initiating, terminating, switching or modifying signals of any light source of air scoop light unit 210 may be performed by an associated control system such as control system 206 of vehicle 200. Light emitting areas may be continuous or non-continuous having portions with different functions or orientations such may be suitable for the application.

Light emitting areas 211A, 211B and 211C may emit, transmit, or reflect light via lens areas 212A, 212B and 212C, respectively. Lens areas 212A, 212B and 212C may be made from glass or an injection molded polymer such as polycarbonate or any suitable material or process provided that it may be transparent or translucent. Lens areas 212A, 212B and 212C may be continuous or non-continuous having portions with different functions, colors or orientations. For example, lens areas 212A and 212B could comprise a clear lens material generally facing forward such as for a headlight, while lens area 212C could comprise an amber lens material at least partially facing to the side such as for a turn signal lamp.

Housing body 214 may secure light emitting areas 211A, 211B and 211C, lens areas 212A, 212B and 212C and communication lead 213 as well as optional features such as force generating member 250 or any sensing devices such as camera 260 or detection sensor 261. Housing body 214 may be made of injection molded plastic such as acrylonitrile butadiene styrene (ABS) or polyamide material and may comprise a unitary construction or a plurality of components assembled by any suitable means such as by flowed-material joints or fasteners.

Furthermore, air scoop light unit 210 optionally may include offset regions 265A and 265B which may be localized surfaces offset from the surface of air scoop light unit 210. In this embodiment, offset regions 265A and 265B may be offset into the walls of housing body 214 and may be designed to affect stresses such as to intentionally create stress concentrations such that air scoop light unit 210 may buckle, deform or fracture when a predetermined value of external force EXF may be applied to air scoop light unit 210 in order to allow at least partial deformation of air scoop light unit 210 into flow channel 219 thereby absorbing energy and reducing damage or injury to colliding object OBJ for example being a pedestrian as exemplified in FIG. 3. Offset regions 265A and 265B may be molded, formed or cut into any internal or external surface of air scoop light unit 210, or for example molded into surfaces of housing body 214.

Figure 6:
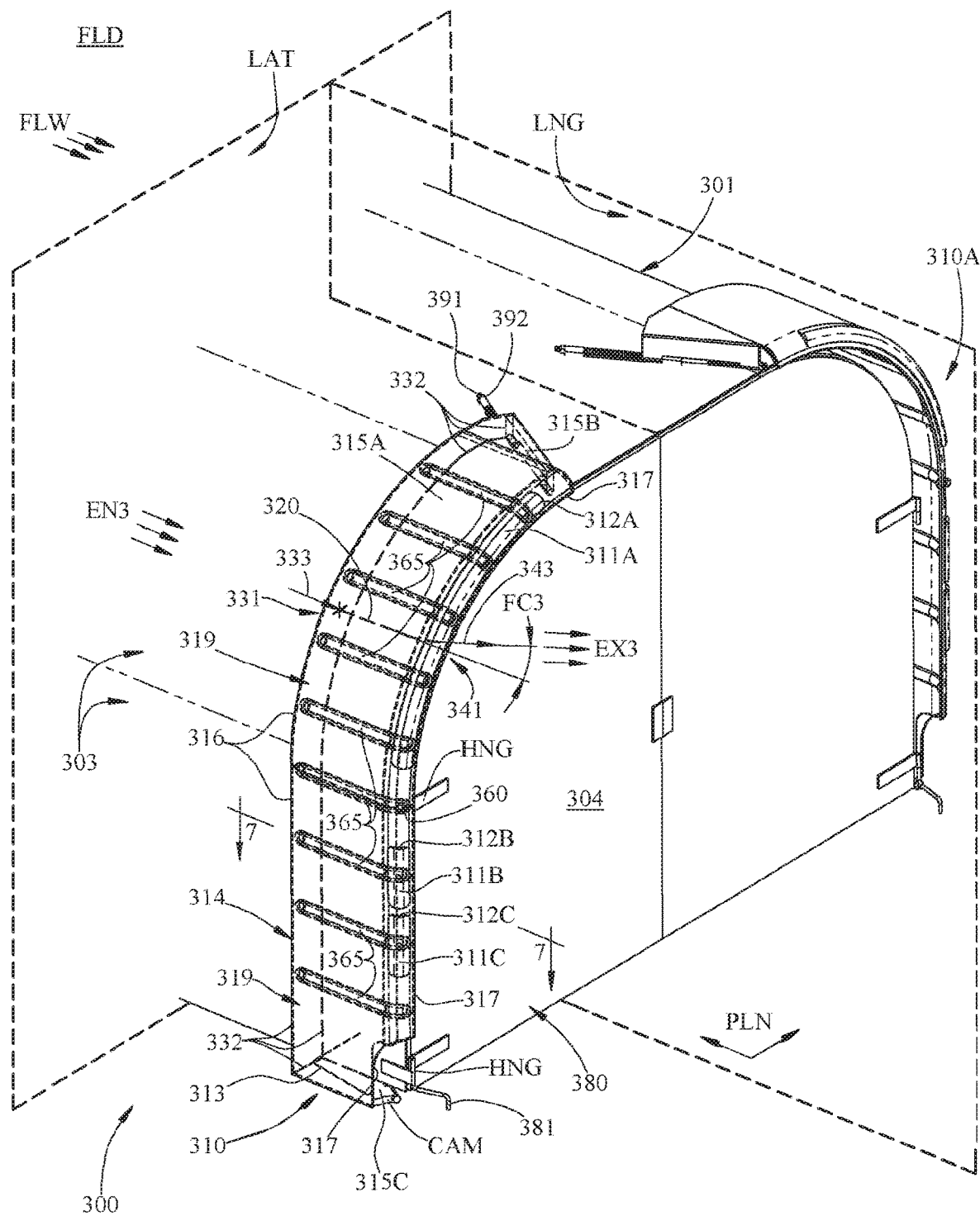
FIG. 6 is a perspective view of a portion of another example of a vehicle having another air scoop light unit in accordance with the subject matter of the present disclosure.
Figure 7A:
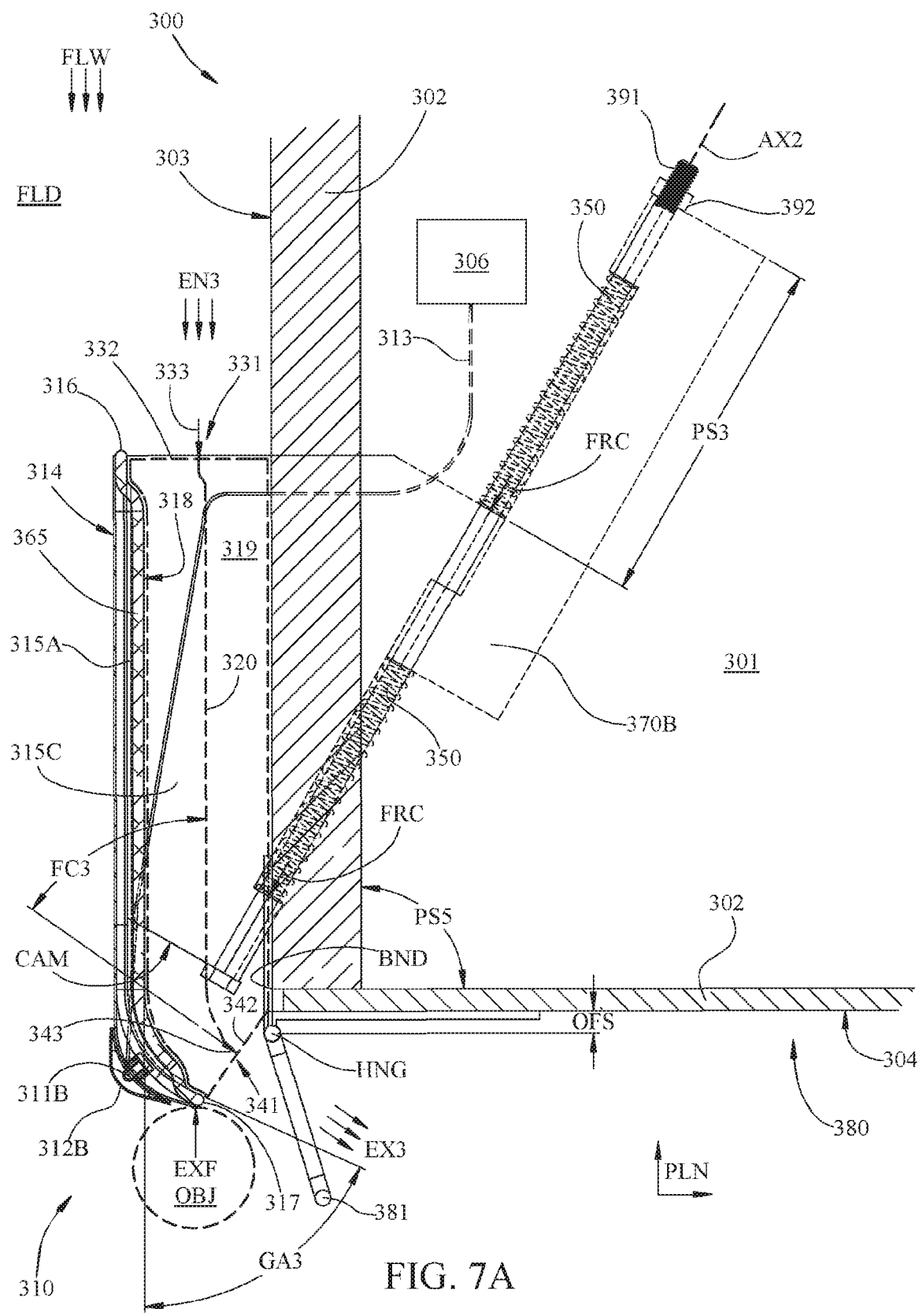
FIG. 7A is a sectional view of the air scoop light unit mounted on the vehicle shown in FIG. 6 taken along section 7-7 therein depicting one position.
Figure 7B:
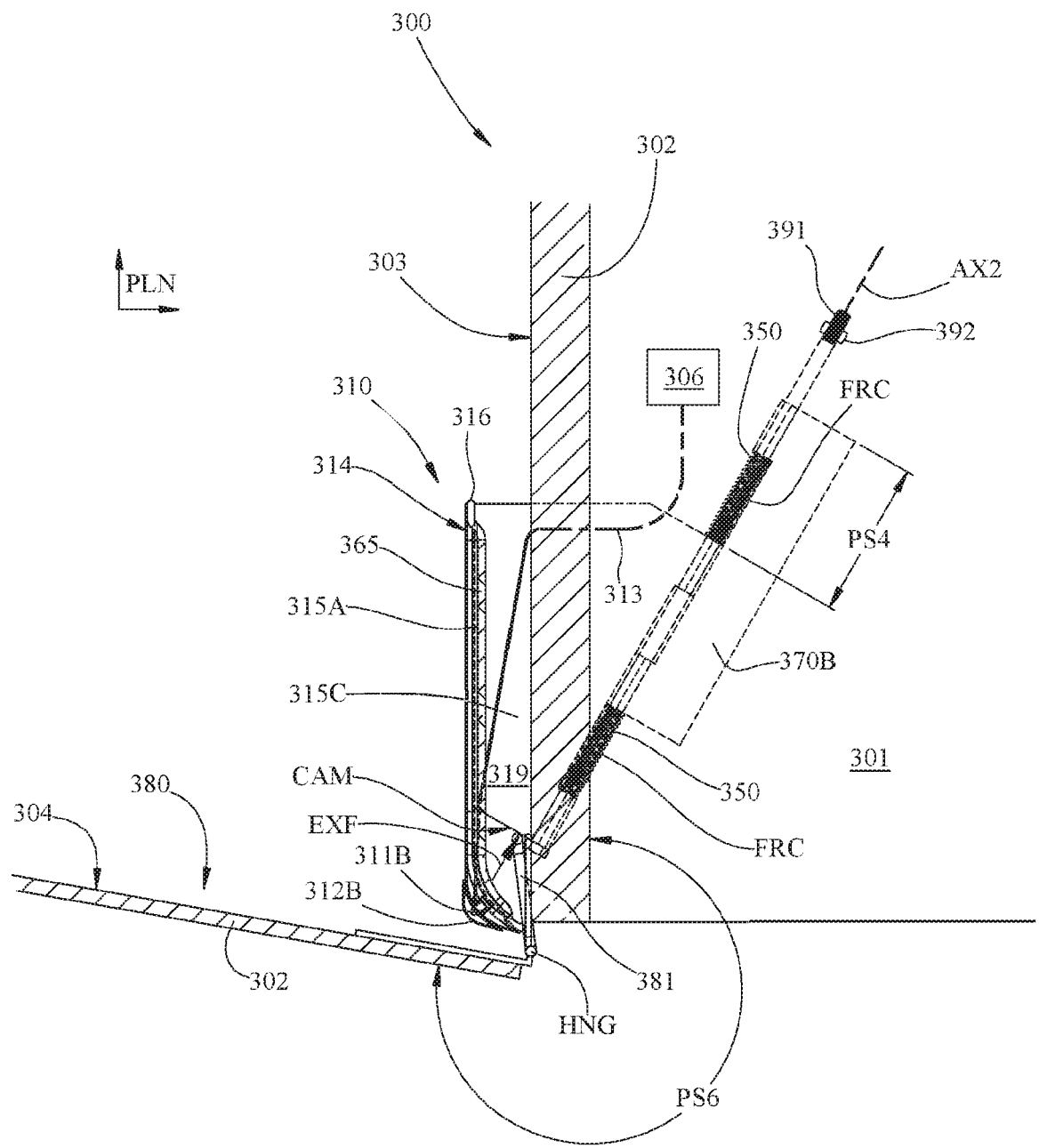
FIG. 7B is a sectional view of the air scoop light unit mounted on the vehicle shown in FIG. 6 taken along section 7-7 therein depicting another position.

In another embodiment, FIGS. 6, 7A and 7B illustrate vehicle 300 having body 301 consisting of a plurality of body members 302. Vehicle 300, for example being a delivery truck or towed freight van trailer, may be capable of moving through fluid FLD generating relative flow FLW. Longitudinal plane LNG may be a virtual vertical reference plane intersecting the front, rear and approximate longitudinal centerline of vehicle 300 and generally tangential to relative flow FLW when generated. Lateral plane LAT may be a virtual vertical reference plane perpendicular to longitudinal plane LNG and generally transverse to relative flow FLW when generated. Both longitudinal plane LNG and lateral plane LAT may be perpendicular to horizontal reference plane PLN.

With respect to FIG. 7A, the relative flow FLW may flow around exterior convex corner portions BND of a vehicle body, which in this example may be a rear left corner portion, or a rear right corner portion (and potentially rear top or bottom (or both) portions). For example, in various example embodiments the relative flow FLW may move from first body surface 303, for example being a side body surface, to second body surface 304, for example being a rear body surface which may include door 380. When first body surface 303 is projected on longitudinal plane LNG, its projected area may be greater than when first body surface 303 is projected on lateral plane LAT. When second body surface 304 is projected on lateral plane LAT, its projected area may be greater than when second body surface 304 is projected on longitudinal plane LNG. First and second body surfaces 303 and 304 may each comprise one or more body members 302 in part or in whole or share portions thereof. First body surface 303 and second body surface 304 may be substantially not co-planar with one another. Air scoop light unit 310 may be located in proximity to first body surface 303 and second body surface 304, for example on a rear corner of vehicle 300 in a similar manner as air scoop light unit 117 on vehicle 100 of FIG. 1. Similar air scoop light unit 310A may reside on the complimentary corner of the same end of vehicle 300.

Air scoop light unit 310 may include light emitting areas 311A, 311B and 311C, lens areas 312A, 312B and 312C, communication lead 313 and housing body 314. Optionally, air scoop light unit 310 may include sensing device 360, for example being a camera or a detection sensor. Light emitting areas 311A, 311B and 311C and sensing device 360 may be for example connected to communication lead 313 for communication with a control system for example being control system 306 of vehicle 300, but could have separate communication leads or connect to different control systems.

Figure 8:
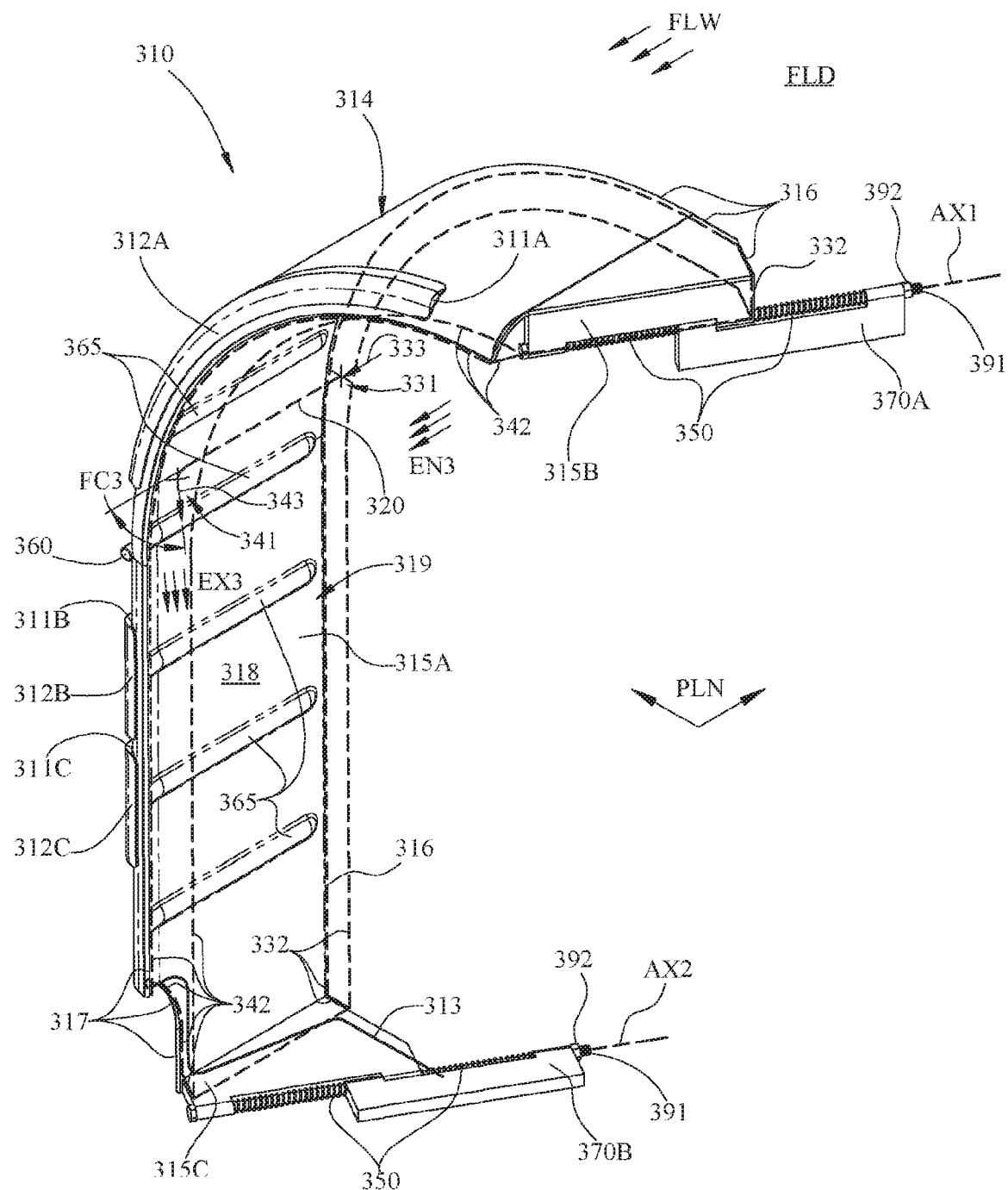
FIG. 8 is a perspective view of an exemplary air scoop light unit from FIG. 6 in accordance with the subject matter of the present disclosure.

As further indicated in FIG. 8, air scoop light unit 310 also may include leading edge 316 and trailing edge 317 with concave guiding surface 318 there between in spaced relation to vehicle body 301. Concave guiding surface 318 may turn through guiding angle GA3 having at least a component thereof in horizontal reference plane PLN, whereas concave guiding surface 318 may at least partially define flow channel 319 having flow path 320. Wherein, housing body 314 may be dimensioned for securement to vehicle 300 and may comprise housing portions 315A, 315B and 315C, whereas housing portion 315A may include concave guiding surface 318 which approximates an offset profile of a portion of body 301. Housing portions 315B and 315C may extend from housing portion 315A towards body 301. Housing portion 315C optionally serves as a support such as a step that generally supports the weight of a human body and may be used for one of ingress or egress of vehicle 300 or accessing its cargo.

First body surface 303 may be associated with leading edge 316, entrant flow EN3 and first flow geometry 331, whereas entrant flow EN3 may be a portion of relative flow FLW and first flow geometry 331 may comprise first flow area 332 and first flow direction 333. Boundary BND of body surface 303 lies on flow channel 319. Second body surface 304 may be associated with trailing edge 317, exit flow EX3 and second flow geometry 341, whereas exit flow EX3 may include a portion of a form of entrant flow EN3 and second flow geometry 341 may comprise second flow area 342 and second flow direction 343. First flow direction 333 approximates the direction of concave guiding surface 318 in proximity to leading edge 316 while second flow direction 343 approximates the direction of concave guiding surface 318 in proximity to trailing edge 317 at their respective cross-section locations. Second flow direction 343 may be different from first flow direction 333 resulting in flow change angle FC3 having at least a component of flow change angle FC3 in horizontal reference plane PLN, whereas flow change angle FC3 approximates guiding angle GA3. Furthermore, guiding angle GA3 may be consistent or varied at different cross-section locations depending on the application. In the arrangement shown in this exemplary embodiment, guiding angle GA3 may be consistent and may be between 30 and 60 degrees, for example, depending on the magnitude of relative flow FLW for the application.

Light emitting areas 311A, 311B and 311C may comprise components for illumination known by those skilled in the art such as light sources, reflectors, shields and diffusers.

Light sources may include, for example, incandescent lamps, light-emitting-diodes (LEDs), xenon lamps, high-intensity-discharge (HID) lamps, optic conductors or any suitable type. Reflectors may include, for example, polished or plated metal stampings or injection molded plastic components with reflective coatings or any suitable construction or material as may the shields and diffusers.

For example, light emitting area 311A may include a plurality of light sources that may be operatively steady when illuminated such as, but not limited to a tail lamp, marker lamp, cargo lamp or spot lamp, while also including a plurality of light sources that may be operatively regulated such as, but not limited to a turn signal lamp, brake lamp, hazard lamp, backup lamp or emergency lamp. For example, light emitting area 311B may include a light source that may be operatively regulated such as, but not limited to a turn signal lamp, brake lamp, hazard lamp, backup lamp or emergency lamp. For example, light emitting area 311C may include a light source that may be operatively steady when illuminated such as, but not limited to a tail lamp, marker lamp, cargo lamp or spot lamp. Functions such as initiating, terminating, switching or modifying signals of any light source of air scoop light unit 310 may be performed by an associated control system such as control system 306 of vehicle 300. Light emitting areas may be continuous or non-continuous having portions with different functions or orientations such may be suitable for the application.

Light emitting areas 311A, 311B and 311C may emit, transmit, or reflect light via lens areas 312A, 312B and 312C, respectively. Lens areas 312A, 312B and 312C may be made from glass or an injection molded polymer such as polycarbonate or any suitable material or process provided that it may be transparent or translucent. Lens areas 312A, 312B and 312C may be continuous or non-continuous having portions with different functions, colors or orientations. For example, lens area 312A could partially comprise a red lens material generally facing backward such as for tail or brake lamps as well as partially comprise an amber lens material such as for marker or turn signal lamps facing both backward and sideward. For example, lens area 312B could partially comprise a clear or white lens material at least partially facing backwards such as for a backup lamp. For example, lens area 312C could partially comprise a red lens material at least partially facing backwards such as for a tail lamp and partially comprise an amber lens material at least partially facing sideward such as for a marker lamp.

Housing body 314 may secure light emitting areas 311A, 311B and 311C and communication lead 313 as well as optional features such as sensing device 360. Housing body 314 may be made of formed sheet metal such as aluminum and may comprise a unitary construction or a plurality of components assembled by any suitable means such as by flowed-material joints or fasteners.

Furthermore, housing portions 315B and 315C may include respective axis AX1 and AX2 which may slidingly engage mounting members 370A and 370B on rods 391 which may be secured by nuts 392. Mounting members 370A and 370B may be dimensioned for securement to vehicle 300 such as by flowed-material joints, fasteners or any suitable means. Housing portions 315B and 315C may also engage at least one force generating member 350 such as springs which may be capable of applying force FRC approximately along one of axis AX1 or AX2 to urge air scoop light unit 310 towards position PS3 as shown in FIG. 7A. When there may be a plurality of force generating members 350, they may all be the same or different as the design requires. Housing body 314 may include a plurality of offset regions 365 offset from surfaces of housing body 314 to affect stresses resulting from applied loads such as to increase rigidity in order to enhance structural stability, maintain flow geometry and minimize deformation that may lead to binding or otherwise inhibit movement of air scoop light unit 310 along one of axis AX1 or AX2. If external force EXF applied to air scoop light unit 310 as shown in FIG. 7A exceeds collective forces FRC from force generating members 350, air scoop light unit 310 may be urged toward position PS4 shown in FIG. 7B. Positional changes may be for one of safety to prevent pinching of object OBJ such as a pedestrian; of operation such as to prevent damage to air scoop light unit 310 from contact with object OBJ for example when backing vehicle 300 against object OBJ such as a dock; or for access such as for providing clearance for opening a door on vehicle 300.

Second body surface 304 optionally resides in part on door 380 and may pivot on hinge pivot HNG with optional driver 381 which may be fixed relative to door 380 whereas hinge pivot HNG may be offset distance OFS from second body surface 304. With door 380 in closed position PS5 as shown in FIG. 7A, air scoop light unit 310 may be in position PS3. Upon opening door 380, for instance when flow FLW may be negligible, driver 381 engages cam CAM on housing portion 315C exerting external force EXF and urging air scoop light unit 310 along one of axis AX1 or AX2 towards position PS4, for example, until door 380 reaches open position PS6 as shown in FIG. 7B.

Figure 9:
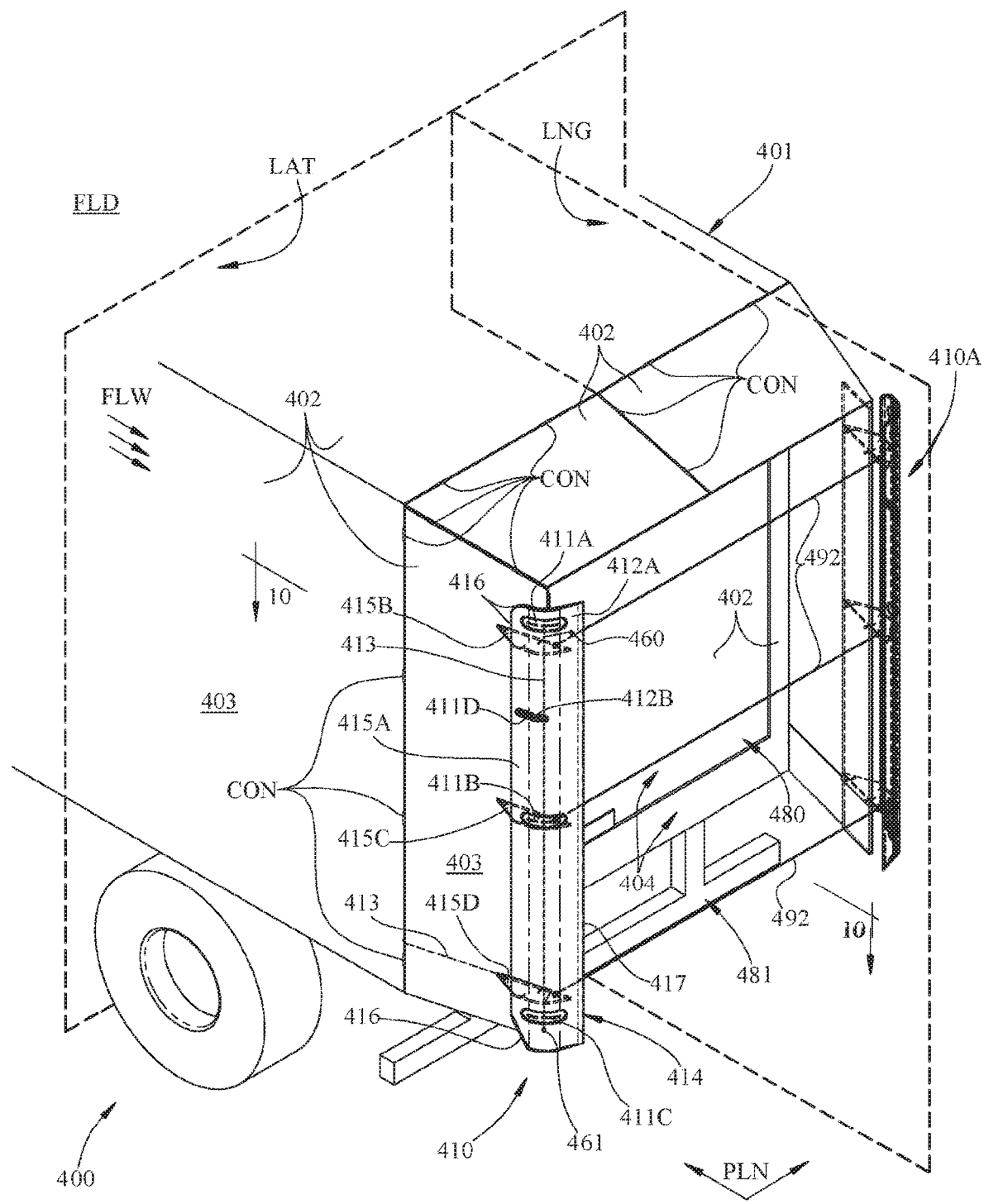
FIG. 9 is a perspective view of a portion of another example of a vehicle having another air scoop light unit in accordance with the subject matter of the present disclosure.
Figure 10:
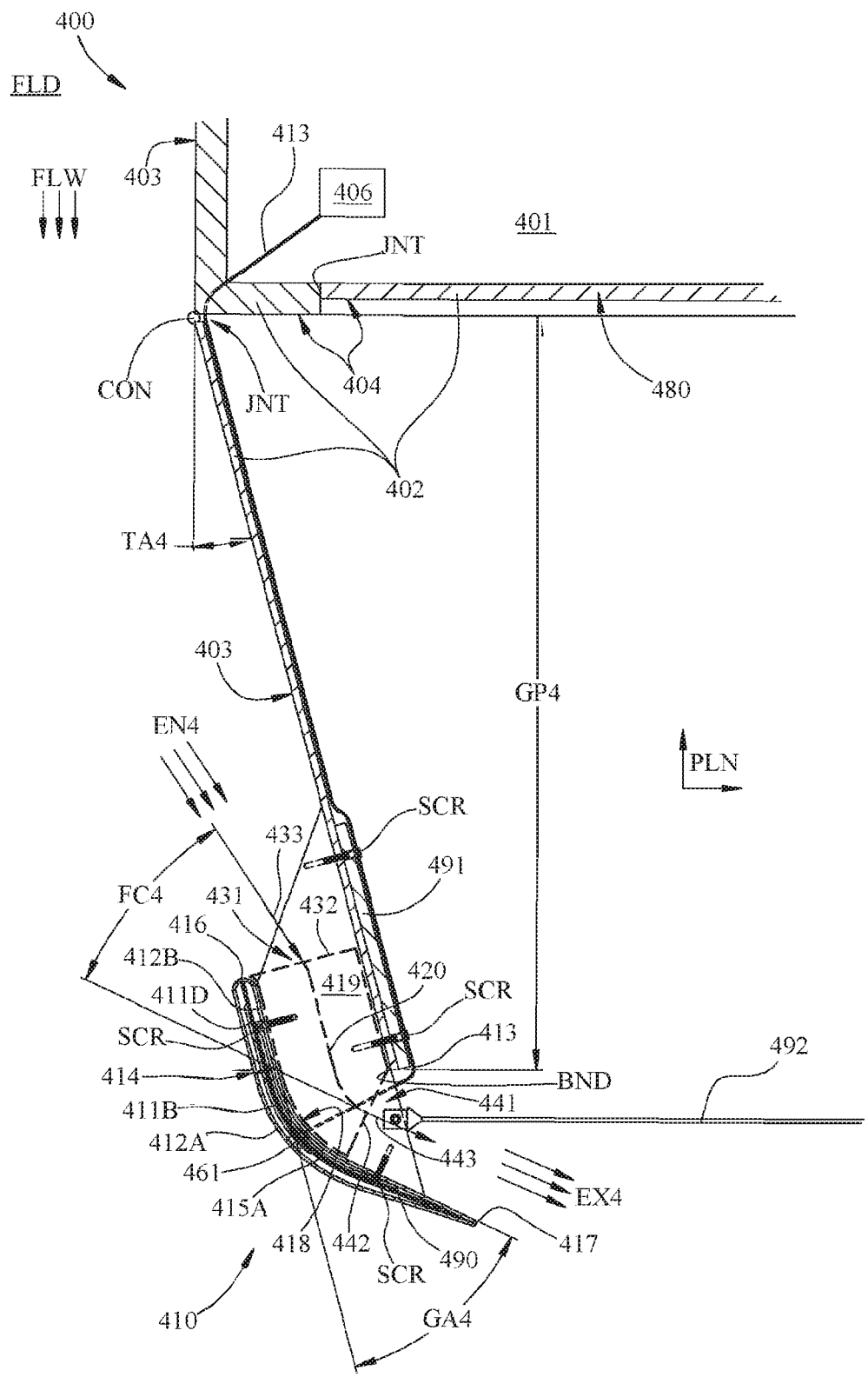
FIG. 10 is a sectional view of the air scoop light unit mounted on the vehicle shown in FIG. 9 taken along section 10-10 therein.

In another embodiment, FIGS. 9 and 10 illustrate a portion of vehicle 400 having body 401 consisting of a plurality of body members 402. Body members 402 may be in relative close proximity or touching at joint JNT, attached by connector CON or separated by gaps such as GP4. Vehicle 400, for example being a delivery truck or towed freight van trailer, may be capable of moving through fluid FLD generating relative flow FLW. Longitudinal plane LNG may be a virtual vertical reference plane intersecting the front, rear and approximate longitudinal centerline of vehicle 400 and generally tangential to relative flow FLW when generated. Lateral plane LAT may be a virtual vertical reference plane perpendicular to longitudinal plane LNG and generally transverse to relative flow FLW when generated. Both longitudinal plane LNG and lateral plane LAT may be perpendicular to horizontal reference plane PLN.

Relative flow FLW may move from first body surface 403, for example being a side body surface, to second body surface 404, for example being a rear body surface which may include portions of door 480 and bumper 481. When first body surface 403 is projected on longitudinal plane LNG, its projected area may be greater than when first body surface 403 is projected on lateral plane LAT. When second body surface 404 is projected on lateral plane LAT, its projected area may be greater than when second body surface 404 is projected on longitudinal plane LNG. First and second body surfaces 403 and 404 may each comprise one or more body members 402 in part or in whole or share portions thereof. First body surface 403 and second body surface 404 may be substantially not co-planar with one another. Air scoop light unit 410 may be located in proximity to first body surface 403 and second body surface 404, for example on a rear corner of vehicle 400. Similar air scoop light unit 410A may reside on the complimentary corner of the same end of vehicle 400.

In one example arrangement, first body surface 403 and second body surface 404 may be not continuous, resulting gap GP4. First body surface 403 may turn through tangent angle TA4 towards longitudinal plane LNG whereas tangent angle TA4 may be between 5 and 30 degrees, for example, at a cross-section location intersecting air scoop light unit 410.

Figure 11:
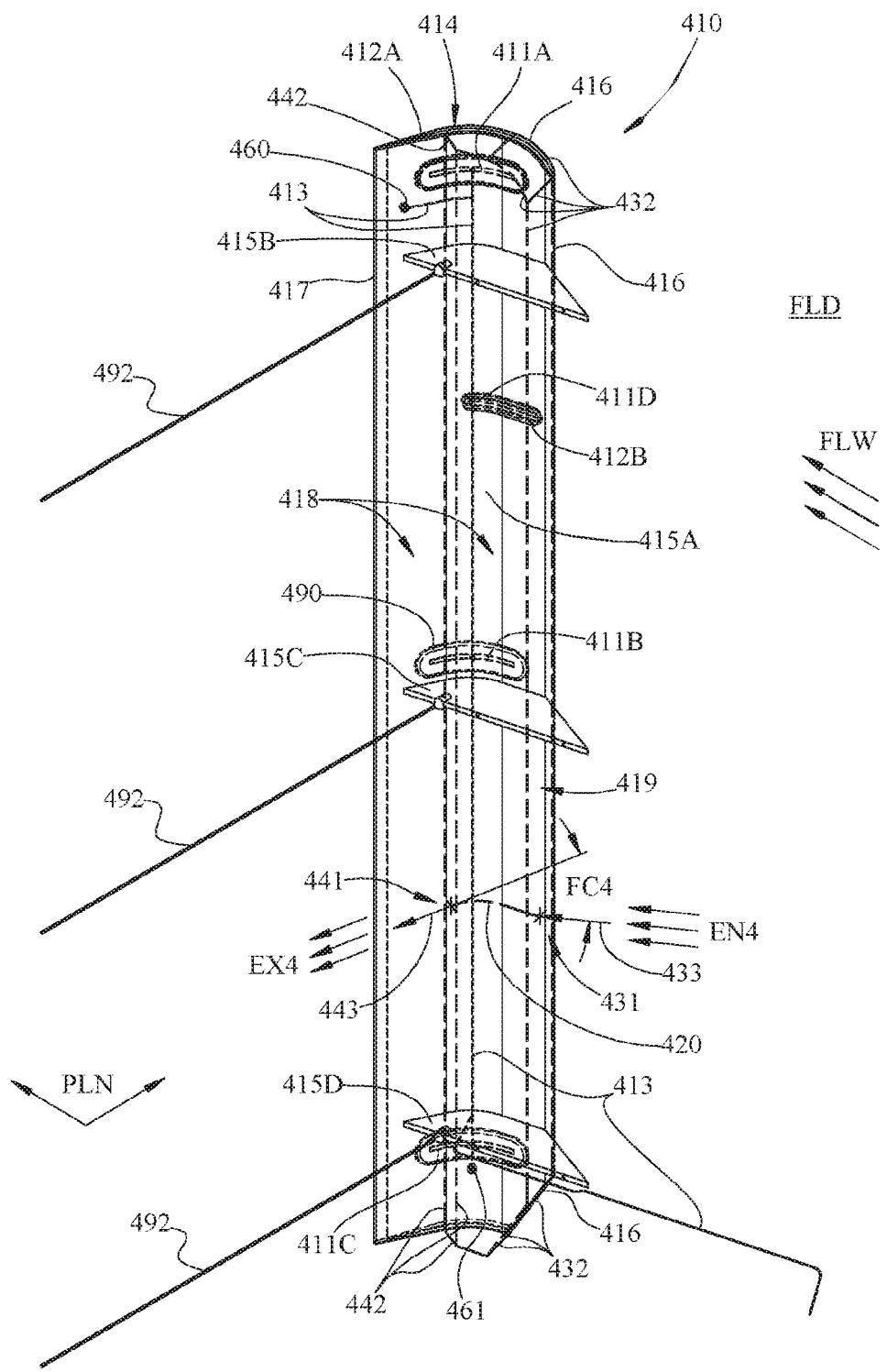
FIG. 11 is a perspective view of an exemplary air scoop light unit from FIG. 9 in accordance with the subject matter of the present disclosure.

As further indicated in FIG. 11, air scoop light unit 410 may include light emitting areas 411A, 411B, 411C and 411D, lens areas 412A and 412B, communication lead 413 and housing body 414. Optionally, air scoop light unit 410 may include sensing devices, for example being camera 460 or detection sensor 461. Light emitting areas 411A, 411B, 411C and 411D, camera 460 and detection sensor 461 may be for example connected to communication lead 413 for communication with a control system for example being control system 406 of vehicle 400, but could have separate communication leads or connect to different control systems.

Air scoop light unit 410 also may include leading edge 416 and trailing edge 417 with concave guiding surface 418 there between in spaced relation to vehicle body 401. Concave guiding surface 418 may rums through guiding angle GA4 having at least a component thereof in horizontal reference plane PLN, whereas concave guiding surface 418 may at least partially define flow channel 419 having flow path 420. Wherein, housing body 414 may be dimensioned for securement to vehicle 400 and may comprise housing portions 415A, 415B, 415C and 415D, whereas housing portion 415A may include concave guiding surface 418 which approximates an offset profile of a portion of body 401. Housing portions 415B, 415C and 415D may extend from housing portion 415A towards body 401.

First body surface 403 may be associated with leading edge 416, entrant flow EN4 and first flow geometry 431, whereas entrant flow EN4 may be a portion of relative flow FLW and first flow geometry 431 may comprise first flow area 432 and first flow direction 433. Second body surface 404 may be associated with trailing edge 417, exit flow EX4 and second flow geometry 441, whereas exit flow EX4 may include a portion of a form of entrant flow EN4 and second flow geometry 441 may comprise second flow area 442 and second flow direction 443. First flow direction 433 approximates the direction of concave guiding surface 418 in proximity to leading edge 416 while second flow direction 443 approximates the direction of concave guiding surface 418 in proximity to trailing edge 417 at their respective cross-section locations. Second flow direction 443 may be different from first flow direction 433 resulting in flow change angle FC4 having at least a component of flow change angle FC4 in horizontal reference plane PLN, whereas flow change angle FC4 approximates guiding angle GA4. Furthermore, guiding angle GA4 may be consistent or varied at different cross-section locations depending on the application. In the arrangement shown in this exemplary embodiment, guiding angle GA4 may be consistent and may be between 30 and 60 degrees, for example, depending on the magnitude of relative flow FLW for the application. In this embodiment, first body surface 403 may be dimensioned for flow separation such that boundary BND lies on flow channel 419 and may be adjacent to second flow area 442 and in proximity to trailing edge 417.

Housing body 414 may secure light emitting areas 411A, 411B, 411C and 411D, member 490, lens areas 412A and 412B as well as optional features such as camera 460 and detection sensor 461. Member 490 may serve as a reinforcement to housing body 414 and also a reflector for light emitting areas 411A, 411B, 411C and 411D. Members 491 and 492 may also serve as reinforcements to counter any reaction forces of air scoop light unit 410 and may be made of any material, shape, orientation or quantity. With regard to safety, it may be desirable that air scoop light unit 410 generally not exceed the outer limits of first body surface 403 in order to maintain side mirror member visibility such as for mirror member 208 for example on vehicle 200 of FIGS. 2 and 3.

Housing portion 415 A may be injection molded poly amide or cast aluminum, for example, while housing portions 415B, 415C and 415D may be formed from metal such as aluminum and optionally serve as supports such as steps that generally supports the weight of a human body and may be used for one of ingress or egress of vehicle 400 or accessing its cargo. Housing portions 415A, 415B, 415C and 415D may be assembled by fasteners such as screws SCR, but flowed-material joints or any combination thereof or any other suitable means may be used. Housing portions 415A, 415B, 415C and 415D may be fixed to lens areas 412A and 412B by flowed-material joints. Optionally, member 490 may be made of stamped aluminum, may be any shape, orientation or quantity to provide adequate structure to incorporate into air scoop light unit 410, whereas member 490 may be captive between housing portion 415A and lens area 412A.

Light emitting areas 411A, 411B, 411C and 411D may comprise components for illumination known by those skilled in the art such as light sources, reflectors, shields and diffusers. Light sources may include, for example, incandescent lamps, light-emitting-diodes (LEDs), xenon lamps, high-intensity-discharge (HID) lamps, optic conductors or any suitable type. Reflectors, may include, for example, polished or plated metal stampings or optionally injection molded plastic components with reflective coatings or any suitable construction or material as may any shields and diffusers.

Light emitting area 411A may include at least one light source that may be operatively steady when illuminated such as, but not limited to a tail lamp or marker lamp while also including at least one light source that may be operatively regulated such as, but not limited to a turn signal lamp, brake lamp or hazard lamp. For example, light emitting area 411B may include a lamp that may be operatively regulated such as, but not limited to a backup lamp. For example, light emitting area 411C may include a light source that may be operatively steady when illuminated such as, but not limited to a tail lamp, marker lamp or cargo lamp. For example, light emitting area 411D may include a light source that may be operatively steady when illuminated such as, but not limited to a spot lamp or cargo lamp for illuminating a portion of vehicle 400, its cargo, adjacent ground surface or loading area. Functions such as initiating, terminating, switching or modifying signals of any light source of air scoop light unit 410 may be performed by an associated control system such as control system 406 of vehicle 400. Light emitting areas may be continuous or non-continuous having portions with different functions or orientations such may be suitable for the application.

Light emitting areas 411A, 411B and 411C may emit, transmit, or reflect light via lens area 412 A while light emitting area 411D emits light through lens area 412B. Lens areas 412A and 412B may be made from glass or an injection molded polymer such as polycarbonate or any suitable material or process provided that it may be transparent or translucent. Lens areas 412A and 412B may be continuous or non-continuous having portions with different functions, colors or orientations. For example, lens area 412A could partially comprise a red lens material generally facing backward such as for tail or brake lamps as well as partially comprise an amber lens material such as for marker or turn signal lamps facing both backward and sideward. For example, lens area 412B could at least partially comprise a clear or white lens material at least partially facing towards the vehicle, ground surface or loading area.

Figure 12:
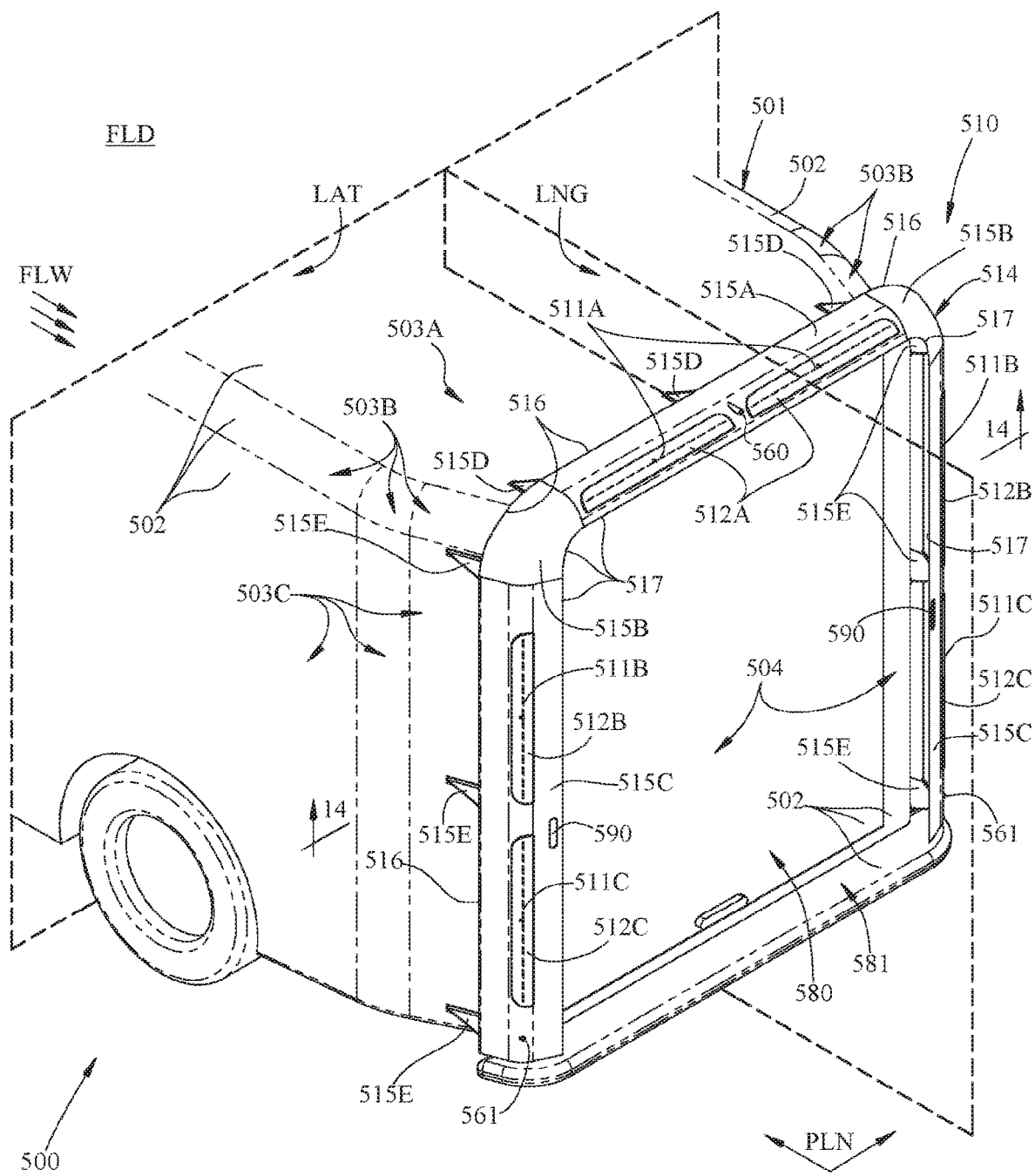
FIG. 12 is a perspective view of a portion of another example of a vehicle having another air scoop light unit in accordance with the subject matter of the present disclosure.
Figure 13:
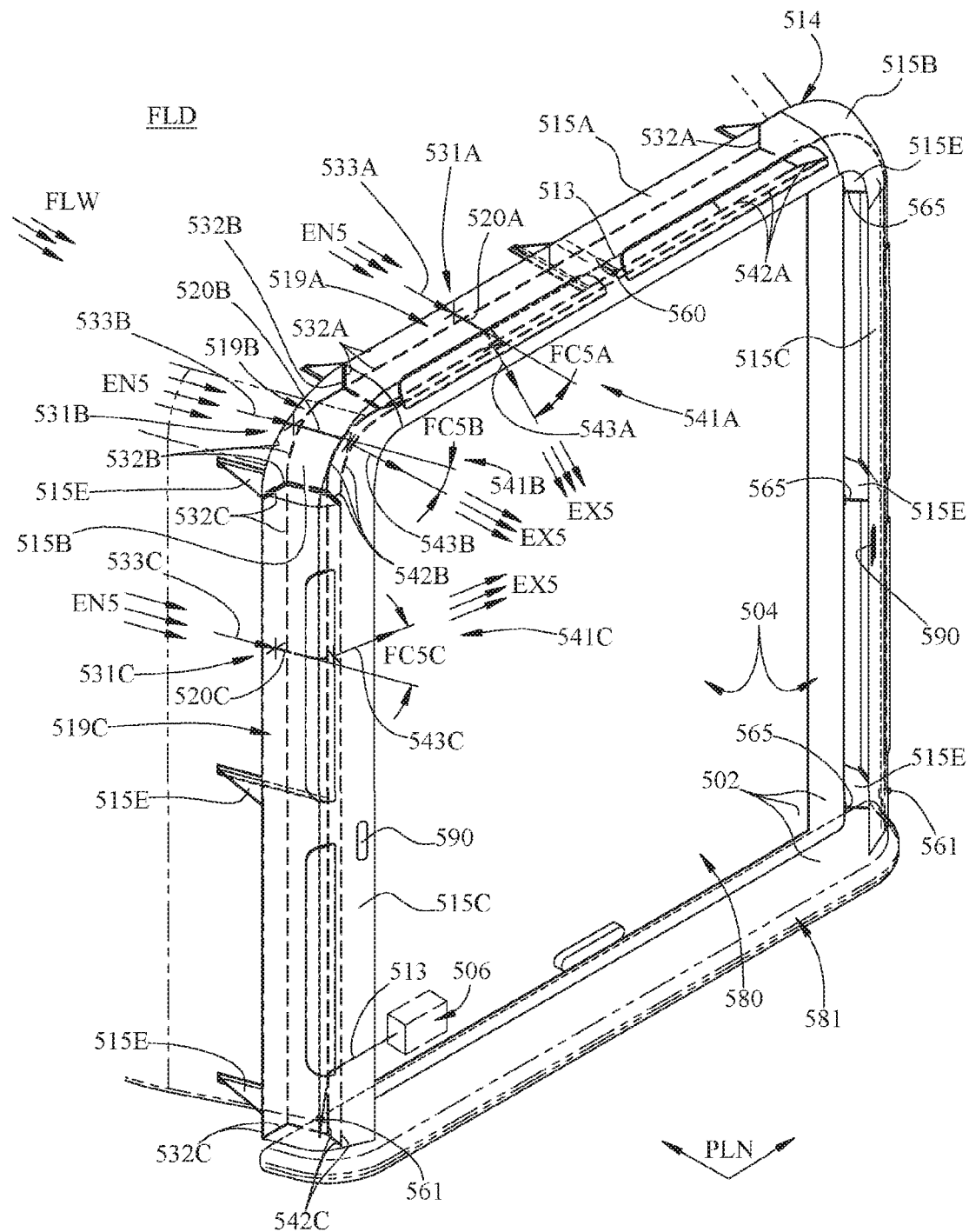
FIG. 13 is another perspective view of a portion of the vehicle shown in FIG. 12 having an air scoop light unit in accordance with the subject matter of the present disclosure.
Figure 14:
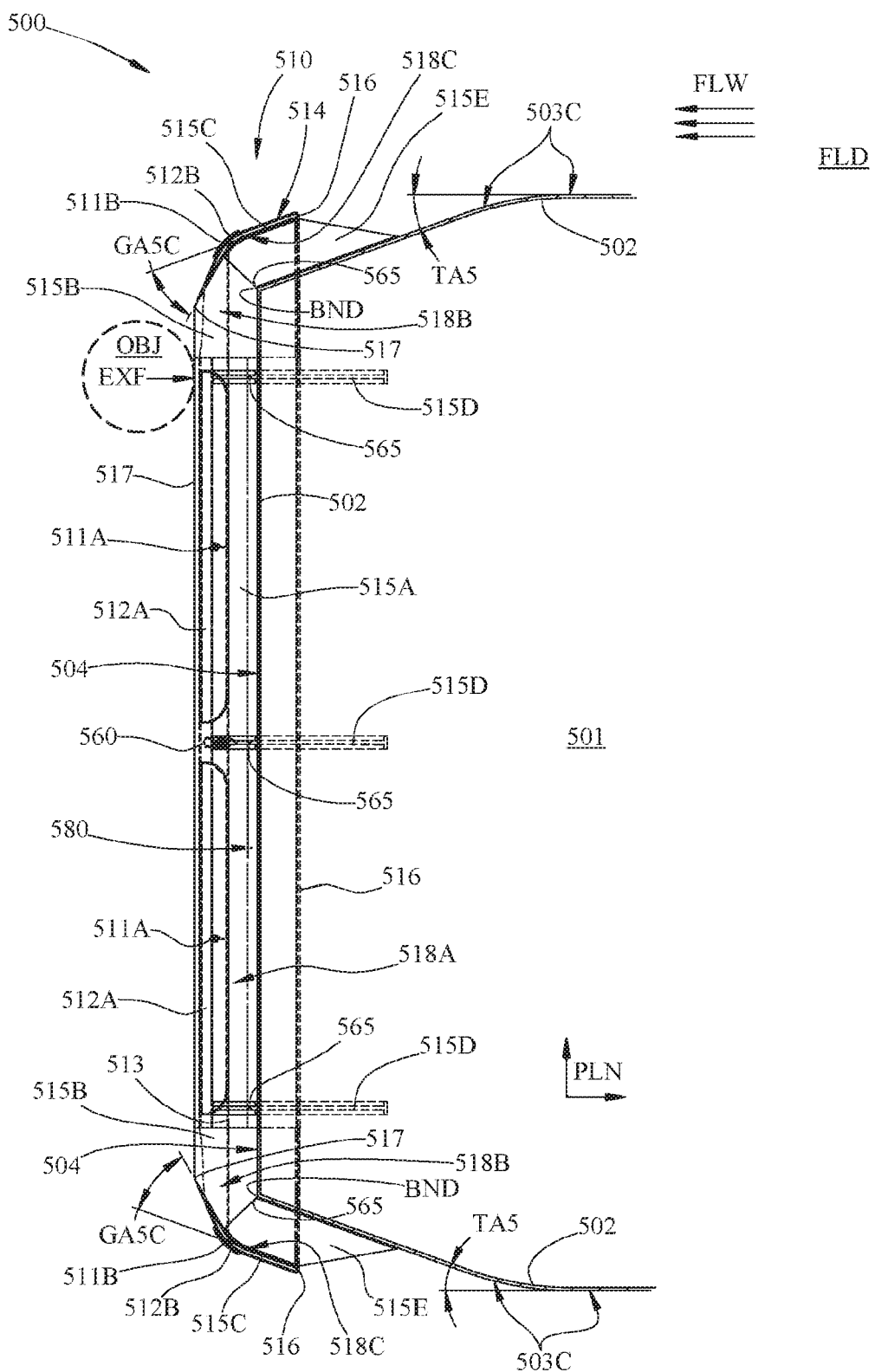
FIG. 14 is a sectional view of the air scoop light unit mounted on the vehicle shown in FIG. 12 taken along section 14-14.

In another embodiment, FIGS. 12, 13 and 14 illustrate vehicle 500 having body 501 consisting of a plurality of body members 502. Vehicle 500, for example being a bus, recreational vehicle, delivery truck or towed freight van trailer, may be capable of moving through fluid FLD generating relative flow FLW. Longitudinal plane LNG may be a virtual vertical reference plane intersecting the front, rear and approximate longitudinal centerline of vehicle 500 and generally tangential to relative flow FLW when generated. Lateral plane LAT may be a virtual vertical reference plane perpendicular to longitudinal plane LNG and generally transverse to relative flow FLW when generated. Both longitudinal plane LNG and lateral plane LAT may be perpendicular to horizontal reference plane PLN.

With respect to FIG. 14, for instance, the relative flow FLW may flow around exterior convex corner portions BND of a vehicle body, which in this example may be a rear left corner portion, or a rear right corner portion (and potentially rear top or bottom (or both) portions). For example, in various example embodiments the relative flow FLW may move from first body surfaces 503A, 503B and 503C, for example being side and top body surfaces, to second body surface 504, for example being a rear body surface which may include portions of door 580 and bumper 581. When first body surfaces 503A, 503B and 503C are collectively projected on longitudinal plane LNG, their projected area may be greater than when first body surfaces 503A, 503B and 503C may be collectively projected on lateral plane LAT. When second body surface 504 is projected on lateral plane LAT, its projected area may be greater than when second body surface 504 is projected on longitudinal plane LNG. First and second body surfaces 503A, 503B, 503C and 504 may each comprise one or more body members 502 in part or in whole or share portions thereof. First body surfaces 503A, 503B and 503C may be substantially not co-planar with second body surface 504. Air scoop light unit 510 may be symmetrical and located in proximity to first body surfaces 503A, 503B and 503C and second body surface 504, for example mounted on and at least partially enveloping the rear end of vehicle 500.

In one example arrangement, first body surface 503C may turn through tangent angle TA5 towards longitudinal plane LNG, whereas tangent angle TA5 may be between 5 and 30 degrees, for example, at a cross-section location intersecting air scoop light unit 510.

Air scoop light unit 510 may include light emitting areas 511A, 511B and 511C, lens areas 512A, 512B and 512C, communication lead 513 and housing body 514. Optionally, air scoop light unit 510 may include a sensing device, for example being camera 560 or detection sensors 561. Light emitting areas 511A, 511B and 511C, camera 560 and detection sensors 561 may be for example connected to communication lead 513 for communication with a control system for example being control system 506 of vehicle 500, but could have separate communication leads or connect to different control systems.

Air scoop light unit 510 also may include leading edge 516 and trailing edge 517 with concave guiding surfaces 518A, 518B and 518C there between in spaced relation to vehicle body 501. Concave guiding surfaces 518A, 518B and 518C may turn through respective guiding angles GA5A, GA5B and GA5C, whereas guiding angles GA5B and GA5C have at least a component thereof in horizontal reference plane PLN. Concave guiding surfaces 518A, 518B and 518C may at least partially define flow channels 519A, 519B and 519C having respective flow paths 520A, 520B and 520C. Wherein, housing body 514 may be dimensioned for securement to vehicle 500 and may comprise housing portions 515A, 515B, 515C, 515D and 515E, whereas housing portions 515A, 515B and 515C may have respective concave guiding surfaces 518A, 518B and 518C which approximate an offset profile of a portion of body 501. A plurality of housing portions 515D and 515E may extend from housing portions 515A, 515B and 515C towards body 501.

First body surfaces 503A, 503B and 503C may be associated with leading edge 516, entrant flow EN5 and first flow geometries 531A, 531B and 531C, whereas entrant flow EN5 may be a portion of relative flow FLW and first flow geometries 531A, 531B and 531C may be respectively comprised of first flow areas 532A, 532B and 532C and first flow directions 533A, 533B and 533C. Second body surface 504 may be associated with trailing edge 517, exit flow EX5 and second flow geometries 541A, 541B and 541C, whereas exit flow EX5 may include a portion of a form of entrant flow EN5 and second flow geometries 541A, 541B and 541C may be respectively comprised of second flow areas 542A, 542B and 542C and second flow directions 543A, 543B and 543C. First flow directions 533A, 533B and 533C approximate the directions of respective concave guiding surfaces 518A, 518B and 518C in proximity to leading edge 516 while second flow directions 543A, 543B and 543C approximate the directions of respective concave guiding surfaces 518A, 518B and 518C in proximity to trailing edge 517 at their respective cross-section locations. Second flow directions 543A, 543B and 543C may be different from corresponding first flow directions 533A, 533B and 533C resulting in respective flow change angles FC5A, FC5B and FC5C, whereas flow change angles FC5B and FC5C have at least a component in horizontal reference plane PLN. Flow change angles FC5A, FC5B and FC5C approximate guiding angles GA5A, GA5B and GA5C. Furthermore, guiding angles GA5A, GA5B and GA5C may be consistent or varied at different cross-section locations depending on the application. In the arrangement shown in this exemplary embodiment, one of guiding angles GA5A, GA5B and GA5C may be varied and may be between 30 and 60 degrees, for example, depending on the magnitude of relative flow FLW for the application. In this embodiment, boundary BND of first body surfaces 503A, 503B and 503C may lie on flow channels 519A, 519B and 519C. At least a portion of first body surface 503C may be dimensioned for flow separation at boundary BND whereas boundary BND may be adjacent to second flow area 542 and in proximity to trailing edge 517.

Figure 15:
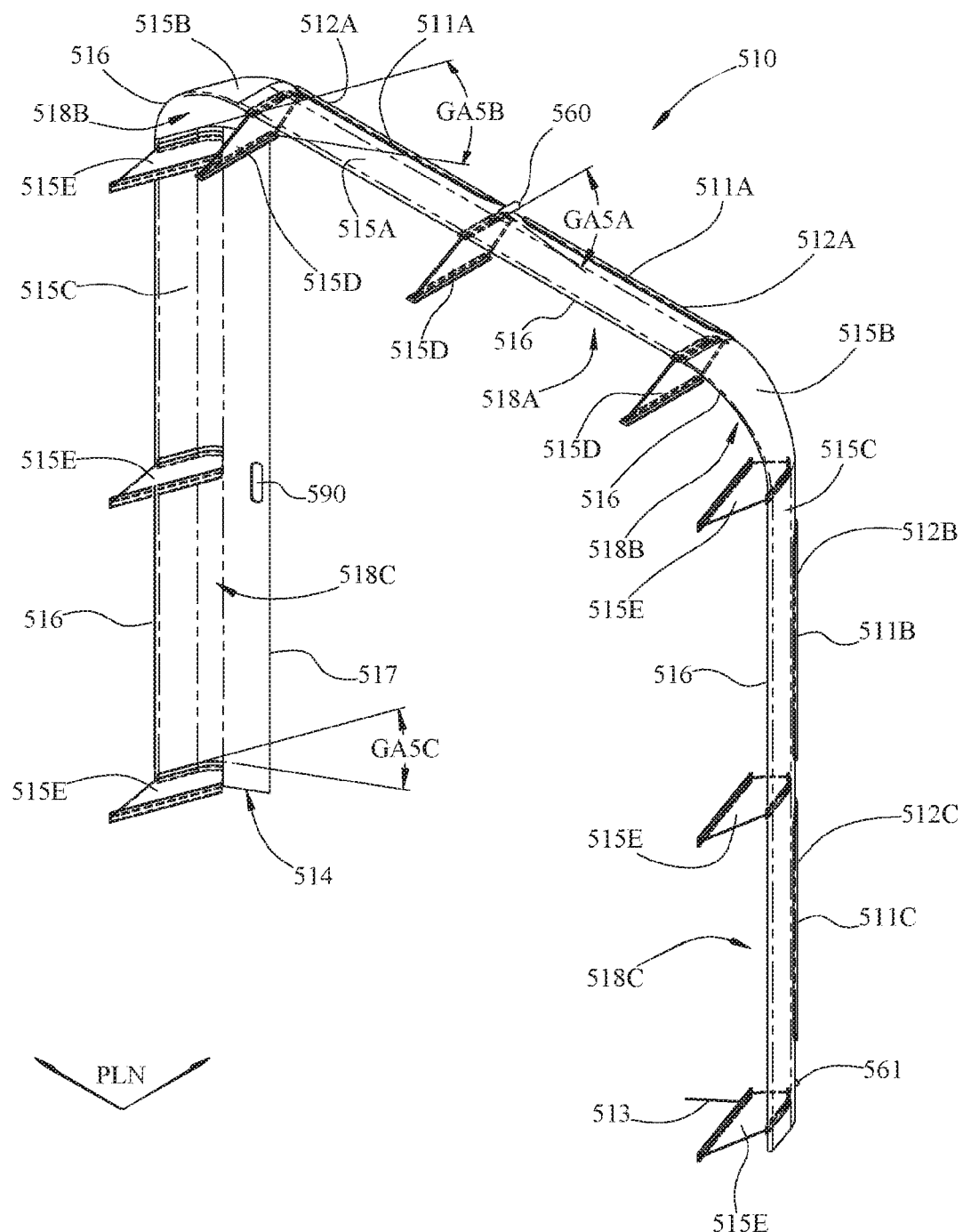
FIG. 15 is a perspective view of an exemplary air scoop light unit from FIG. 12 in accordance with the subject matter of the present disclosure.

As depicted in FIG. 15, housing body 514 may comprise housing portions 515A, 515B, 515C, 515D and 515E. Housing body 514 may secure light emitting areas 511A, 511B and 511C and communication lead 513 as well as optional features such as camera 560 and detection sensors 561. Housing portions 515D and 515E may be dimensioned for securement to vehicle 500 such as by flowed-material joints, fasteners or any suitable means.

Furthermore, air scoop light unit 510 optionally may include offset regions 565 which may be localized surfaces offset from the surface of air scoop light unit 510. In this embodiment, offset regions 565 may be offset into housing portions 515D and 515E and may be designed to intentionally create stress concentrations which cause said housing portions to buckle, deform or fracture when a predetermined value of external force EXF may be applied to air scoop light unit 510 as shown in FIG. 14 in order to absorb energy for one of safety to prevent pinching of object OBJ such as a pedestrian or of reducing damage to body 501 of vehicle 500 from contact with object OBJ. Optionally, flowed-material joints or fasteners associated with housing portions 515D and 515E may be designed to shear or otherwise disconnect upon air scoop light unit 510 experiencing external force EXF. Offset regions 565 may be molded, formed or cut into any internal or external surface of air scoop light unit 510, but may be for example formed into housing portions 515D and 515E. For further safety, it may be desirable that air scoop light unit 510 generally not exceed the outer limits of first body surface 503C in order to maintain side mirror member visibility such as for mirror member 208 for example on vehicle 200 of FIGS. 2 and 3.

Housing portions 515A and 515C may be composite extrusions such as acrylonitrile butadiene styrene (ABS) or aluminum, housing portions 515B, 515D and 515E may be cast aluminum or injection molded poly amide. Alternately, housing portions 515A, 515B and 515C could be combined in a different manner into one or more large moldings such as from fiberglass. Optionally housing portions 515E may function as supports such as steps that generally support the weight of a human body and may be used for one of ingress or egress of vehicle 500 or accessing its cargo. Optionally, housing body 514 may include one or more portion serving as handle 590 that generally supports the weight of a human body and may be used for one of ingress or egress of vehicle 500 or accessing its cargo. Housing portions 515A, 515B and 515C may be assembled by flowed-material joints while housing portions 515D and 515E may be attached with fasteners, but any combination thereof or any other suitable means may be used.

Light emitting areas 511A, 511B and 511C may comprise components for illumination known by those skilled in the art such as light sources, reflectors, shields and diffusers. Light sources may include, for example, incandescent lamps, light-emitting-diodes (LEDs), xenon lamps, high-intensity-discharge (HID) lamps, optic conductors or any suitable type. Reflectors, may include, for example, polished or plated metal stampings or injection molded plastic components with reflective coatings or any suitable construction or material as may any shields and diffusers.

Light emitting area 511A may include at least one light source that may be operatively steady when illuminated such as, but not limited to a tail lamp or marker lamp while also including at least one light source that may be operatively regulated such as, but not limited to a turn signal lamp, brake lamp or hazard lamp. For example, light emitting area 511B may include a light source that may be operatively regulated such as, but not limited to a backup lamp. For example, light emitting area 511C may include a light source that may be operatively steady when illuminated such as, but not limited to a tail lamp, marker lamp or cargo lamp. Functions such as initiating, terminating, switching or modifying signals of any light source of air scoop light unit 510 may be performed by an associated control system such as control system 506 of vehicle 500. Light emitting areas may be continuous or non-continuous having portions with different functions or orientations such may be suitable for the application.

Light emitting areas 511A, 511B and 511C may emit, transmit, or reflect light via respective lens areas 512A, 512B and 512C. Lens areas 512A, 512B and 512C may be made from glass or an injection molded polymer such as polycarbonate or any suitable material or process provided that it may be transparent or translucent. Lens areas 512A, 512B and 512C may be continuous or non-continuous having portions with different functions, colors or orientations. For example, lens area 512A could partially comprise a red lens material generally facing backward such as for tail or brake lamps as well as partially comprise an amber lens material such as for marker or turn signal lamps facing both backward and sideward. Lens area 512B, for example, could partially comprise a clear or white lens material at least partially facing backwards such as for a backup lamp. Lens area 512C, for example, could partially comprise a red lens material at least partially facing backwards such as for a tail lamp and partially comprise an amber lens material at least partially facing sideward such as for a marker lamp.

In another embodiment, FIGS. 16A, 16B, 17 and 18 illustrate vehicle 600 having body 601 consisting of a plurality of body members 602. Vehicle 600, for example being a pickup truck or sport utility vehicle, may be capable of moving through fluid FLD generating relative flow FLW. Longitudinal plane LNG may be a virtual vertical reference plane intersecting the front, rear and approximate longitudinal centerline of vehicle 600 and generally tangential to relative flow FLW when generated. Lateral plane LAT may be a virtual vertical reference plane perpendicular to longitudinal plane LNG and generally transverse to relative flow FLW when generated. Both longitudinal plane LNG and lateral plane LAT may be perpendicular to horizontal reference plane PLN.

Figure 17:
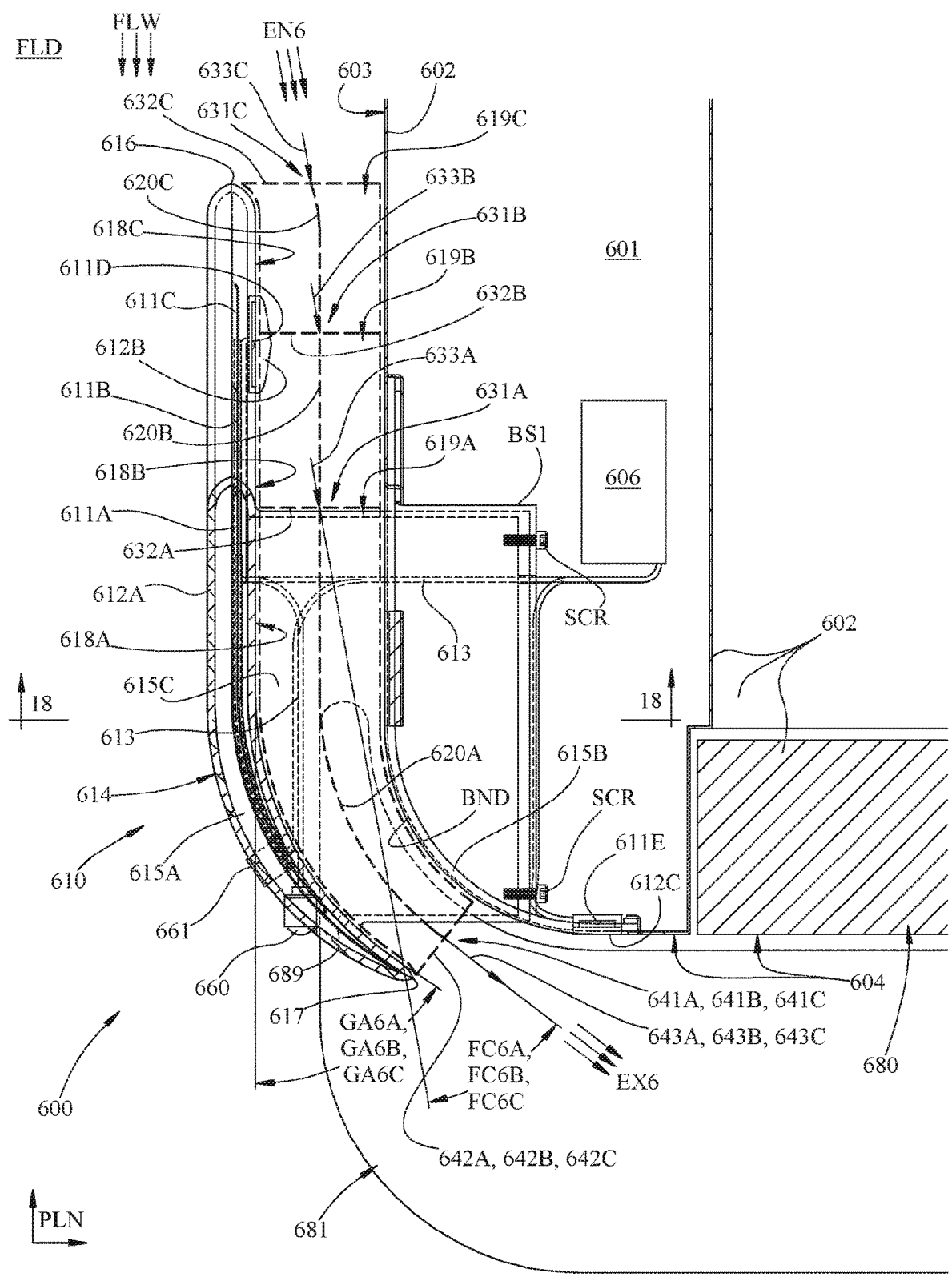
FIG. 17 is a sectional view of the air scoop light unit mounted on the vehicle shown in FIG. 16 taken along section 17-17.

With regard to FIG. 17, for example, the relative flow FLW may flow around exterior convex corner portions BND of the vehicle body, such as a front left corner portion, a front right corner portion, a rear left corner portion, or a rear right corner portion. For example, in various example embodiments the relative flow FLW may move from first body surface 603, for example being a side surface, to second body surface 604, for example being a rear body surface which may include portions of tailgate 680 and bumper 681. When first body surface 603 is projected on longitudinal plane LNG, its projected area may be greater than when first body surface 603 is projected on lateral plane LAT. When second body surface 604 is projected on lateral plane LAT, its projected area may be greater than when second body surface 604 is projected on longitudinal plane LNG. First and second body surfaces 603 and 604 may each comprise one or more body members 602 in part or in whole or share portions thereof. First body surface 603 and second body surface 604 may be substantially not co-planar with one another. Air scoop light unit 610 may be located in proximity to first body surface 603 and second body surface 604, for example on a rear corner of vehicle 600 in a similar manner as air scoop light unit 117 on vehicle 100 of FIG. 1. A similar air scoop light unit 610A may reside on the complimentary corner of the same end of vehicle 600. Vehicle 600, for example could have been originally assembled with conventional lamp assemblies such as lamp assemblies 117 on vehicle 100 of FIG. 1 that were replaced with lamp assemblies such as air scoop light units 610 and 610A which may be dimensioned for attachment to vehicle 600 in a similar manner and in similar positions as the original lamp assemblies.

Figure 19:
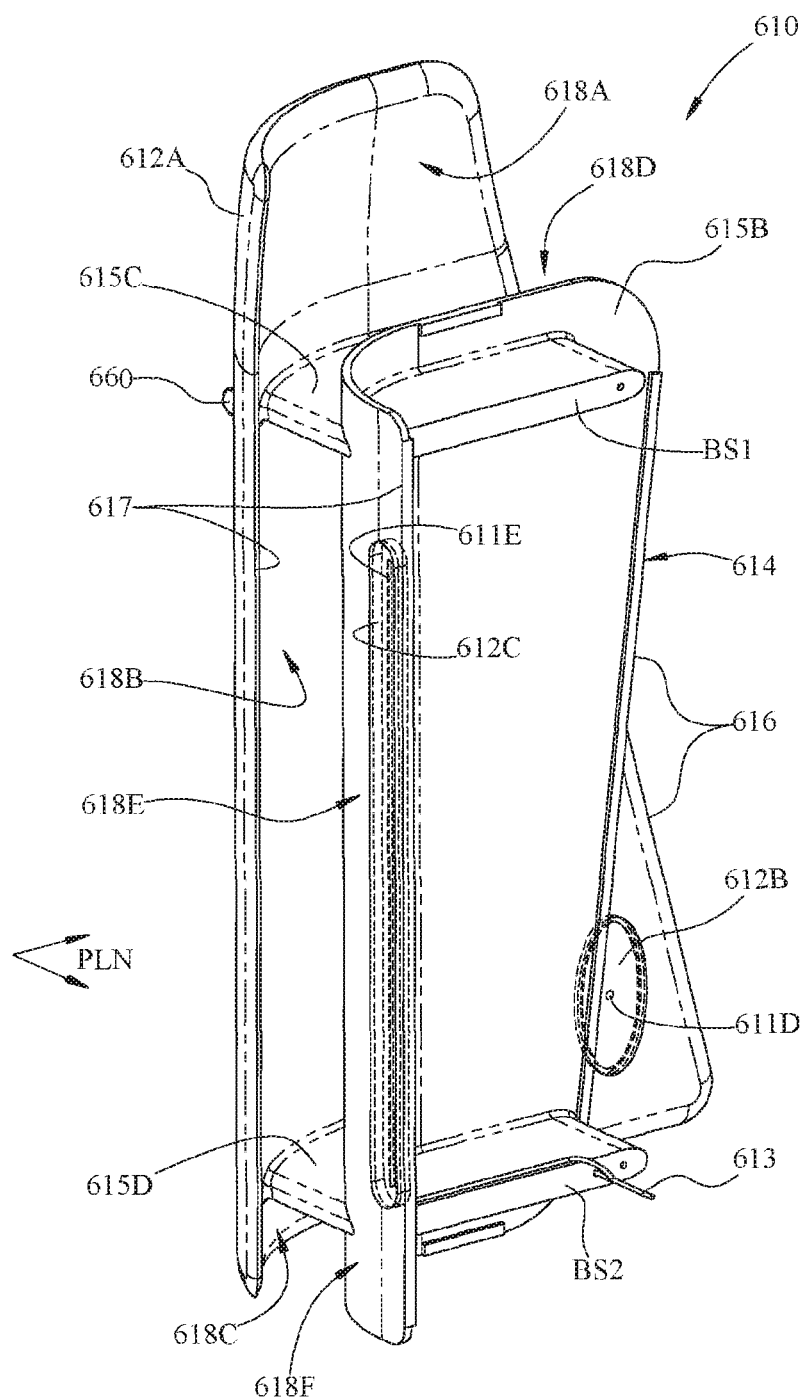
FIG. 19 is a perspective view of an exemplary air scoop light unit from FIG. 16 in accordance with the subject matter of the present disclosure.

As depicted in FIG. 19, air scoop light unit 610 may include light emitting areas 611A, 611B, 611C, 611D and 611E, lens areas 612A, 612B and 612C, communication lead 613 and housing body 614. Optionally, air scoop light unit 610 may include sensing devices, for example being camera 660 or detection sensor 661. Light emitting areas 611A, 611B, 611C, 611D and 611E, camera 660 and detection sensors 661 may be for example connected to communication lead 613 for communication with a control system for example being control system 606 of vehicle 600, but could have separate communication leads or connect to different control systems.

Air scoop light unit 610 also may include leading edge 616 and trailing edge 617 with concave guiding surfaces 618A, 618B and 618C there between in spaced relation to vehicle body 601. Concave guiding surfaces 618A, 618B and 618C may turn through respective guiding angles GA6A, GA6B and GA6C having at least a component thereof in horizontal reference plane PLN, whereas concave guiding surfaces 618A, 618B and 618C may at least partially define flow channels 619A, 619B and 619C having respective flow paths 620A, 620B and 620C. Housing body 614 may be dimensioned for securement to vehicle 600 and may comprise housing portions 615A, 615B, 615C and 615D, whereas housing portion 615A may include concave guiding surfaces 618A, 618B and 618C which approximate an offset profile of a portion of body 601. Housing portions 615C and 615D may extend from housing portion 615A towards body 601 and may be dimensioned for securement to housing portion 615B. Housing portion 615B may be adjacent to body 601 and may include concave guiding surfaces 618D, 618E (and convex guiding surface 618F) which may at least partially define respective flow channels 619A, 619B and 619C.

First body surface 603 may be associated with leading edge 616, entrant flow EN6 and first flow geometries 631A, 631B and 631C, whereas entrant flow EN6 may be a portion of relative flow FLW and first flow geometries 631A, 631B and 631C may be respectively comprised of first flow areas 632A, 632B and 632C and first flow directions 633A, 633B and 633C. Boundary BND of body surface 603 lies on flow channels 619A, 619B and 619C. Second body surface 604 may be associated with trailing edge 617, exit flow EX6 and second flow geometries 641A, 641B and 641 C, whereas exit flow EX6 may include a portion of a form of entrant flow EN6 and second flow geometries 641A, 641B and 641C may be respectively comprised of second flow areas 642A, 642B and 642C and second flow directions 643A, 643B and 643C. First flow directions 633A, 633B and 633C approximate the directions of respective concave guiding surfaces 618A, 618B and 618C in proximity to leading edge 616 while second flow directions 643A, 643B and 643C approximate the directions of respective concave guiding surfaces 618A, 618B and 618C in proximity to trailing edge 617 at their respective cross-section locations. Second flow directions 643A, 643B and 643C may be different from corresponding first flow directions 633A, 633B and 633C resulting in a flow change angles FC6A, FC6B and FC6C having at least a component in horizontal reference plane PLN, whereas flow change angles FC6A, FC6B and FC6C approximate guiding angles GA6A, GA6B and GA6C. Furthermore, guiding angles GA6A, GA6B and GA6C may be consistent or varied at different cross-section locations depending on the application. In the arrangement shown in this exemplary embodiment, one of guiding angles GA6A, GA6B and GA6C may be consistent and may be between 30 and 60 degrees, for example, depending on the magnitude of relative flow FLW for the application.

Housing body 614 may comprise housing portions 615A, 615B, 615C and 615D. Housing body 614 may secure light emitting areas 611A, 611B and 611C, member 689 and communication lead 613 as well as optional features such as camera 660 and detection sensors 661. Member 689 may serve as a reinforcement to housing body 614 and also a reflector for light emitting areas 611A, 611B, 611C and 611D.

Figure 16A:
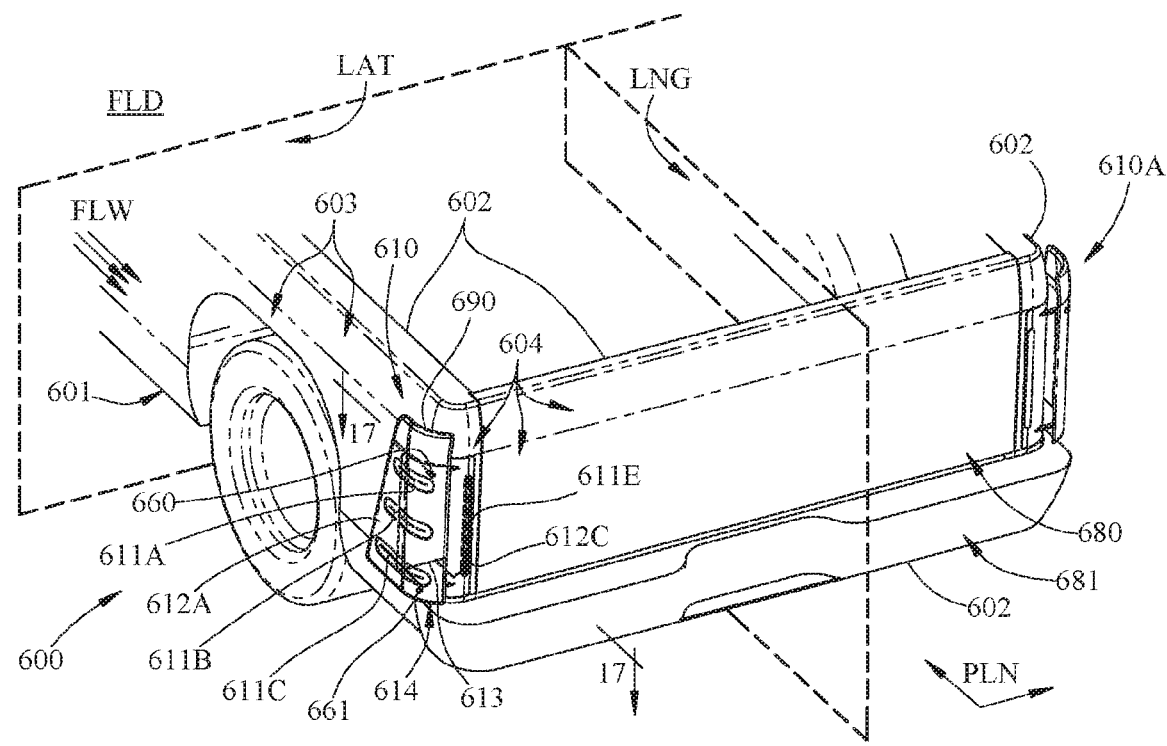
FIG. 16A is a perspective view of a portion of another example of a vehicle having another air scoop light unit in accordance with the subject matter of the present disclosure, therein depicting an assembled arrangement.
Figure 16B:
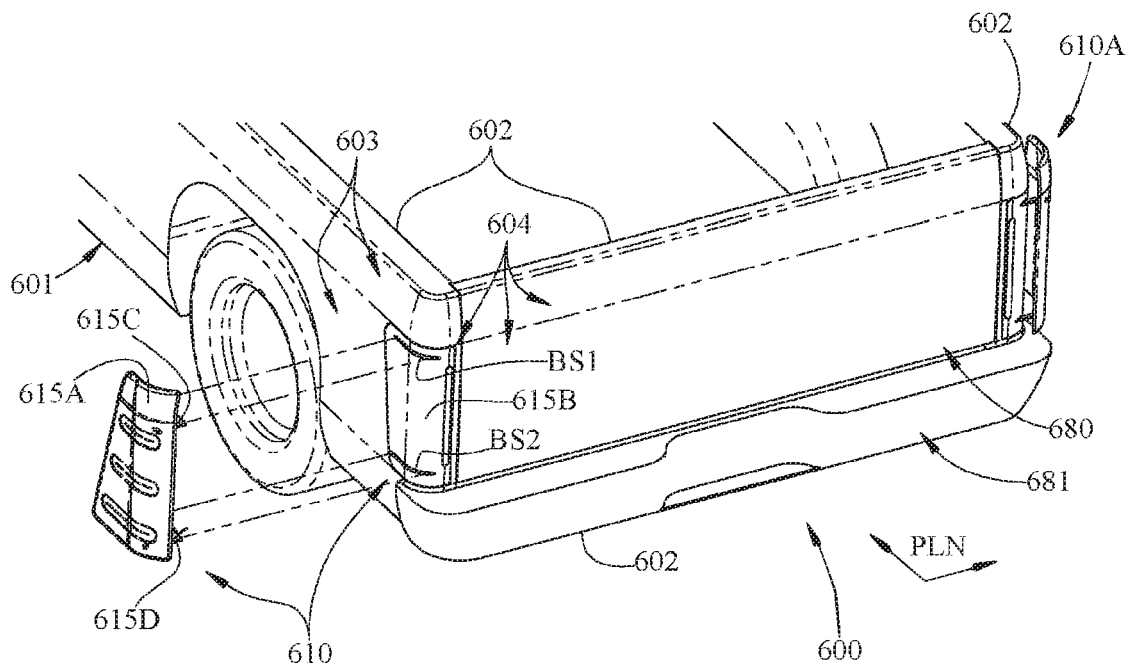
FIG. 16B is a perspective view of the air scoop light unit mounted on the vehicle shown in FIG. 16A, therein depicting a partially exploded arrangement.
Figure 18:
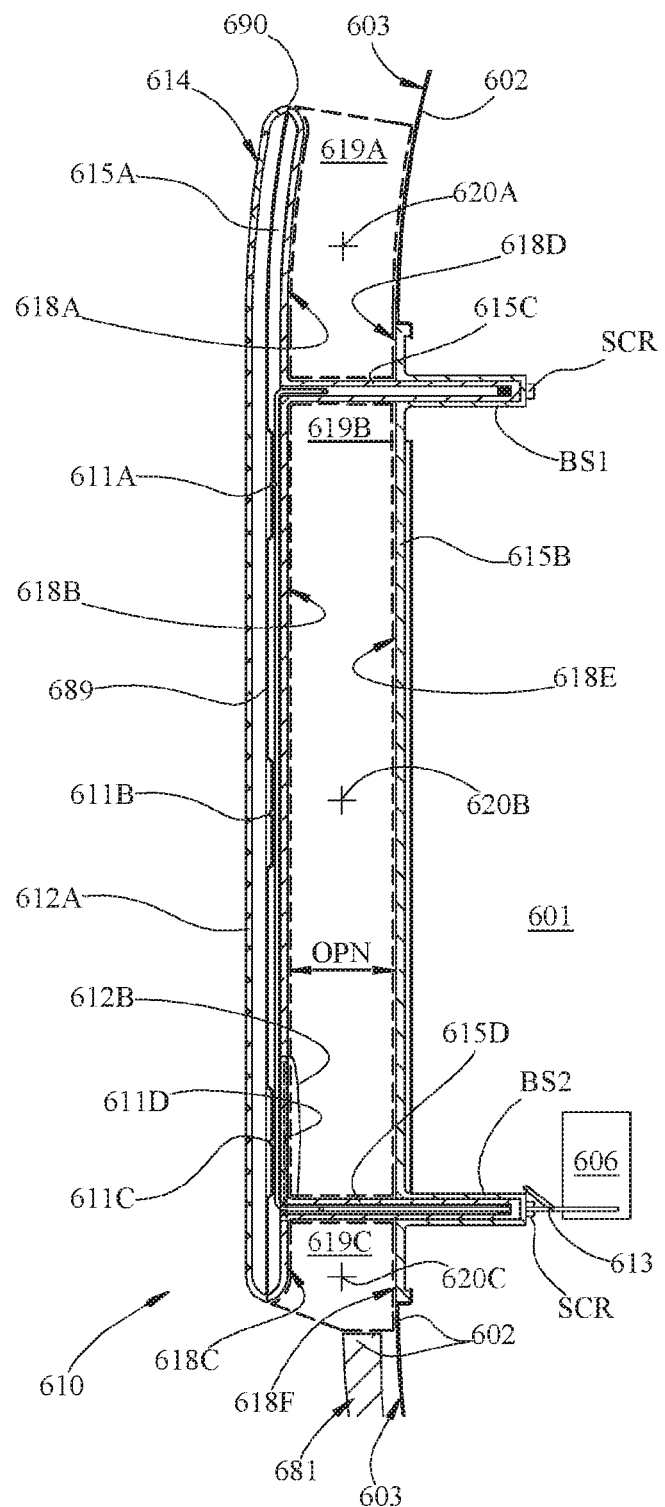
FIG. 18 is a sectional view of the air scoop light unit mounted on the vehicle shown in FIG. 17 taken along section 18-18.

Housing portions 615A, 615B, 615C and 615D may be an injection molded polyamide or acrylonitrile butadiene styrene (ABS) material. Housing portions 615A, 615C and 615D may be a unitary construction. Housing portion 615B may include bosses BS1 and BS2 dimensioned to receive respective housing portions 615C and 615D in a sliding engagement while attaching with screws SCR, but could alternately use flowed-material joints, fasteners of any type or any suitable attachment method, permitting an assembled configuration as shown in FIG. 16A and a partially unassembled configuration as shown in FIG. 16B. Additionally, spacers (not shown) could optionally be installed between housing portions 615C and 615D and respective bosses BS1 and BS2 for example to adjust opening OPN as shown in FIG. 18. Furthermore, housing portion 615B allows different designs or configurations of housing body 614, including designs having housing portion 615A with different shapes or lamp configurations, but similar housing portions 615C and 615D for reception into respective bosses BS1 and BS2. Optionally, member 689 may be captive between housing portion 615A and lens area 612A, said member 689 being optionally made of stamped aluminum, but may be any shape, orientation or quantity to provide adequate structure to incorporate into air scoop light unit 610 being. Optionally, housing body 614 may include a portion serving as a support such as handle 690 that generally supports the weight of a human body and may be used for one of ingress or egress of vehicle 600 or accessing its cargo.

Light emitting areas 611A, 611B, 611C, 611D and 611E may comprise components for illumination known by those skilled in the art such as light sources, reflectors, shields and diffusers. Light sources may include, for example, incandescent lamps, light-emitting-diodes (LEDs), xenon lamps, high-intensity-discharge (HID) lamps, optic conductors or any suitable type. Reflectors may include, for example, polished or plated metal stampings or optionally injection molded plastic components with reflective coatings or any suitable construction or material as may any shields and diffusers.

Light emitting area 611A may include at least one light source that may be operatively steady when illuminated such as, but not limited to a tail lamp or marker lamp while also including at least one light source that may be operatively regulated such as, but not limited to a turn signal lamp, brake lamp or hazard lamp. For example, light emitting area 611B may include a light source that may be operatively regulated such as, but not limited to a turn brake lamp. For example, light emitting area 611C may include a light source that may be operatively steady when illuminated such as, but not limited to a tail lamp or marker lamp. For example, light emitting area 611D may include a light source that may be operatively steady when illuminated such as, but not limited to a spot lamp or cargo lamp for illuminating a portion of vehicle 600, its cargo, ground surface or loading area. For example, light emitting area 611E may include a light source that may be operatively regulated such as, but not limited to a backup lamp. Functions such as initiating, terminating, switching or modifying signals of any light source of air scoop light unit 610 may be performed by an associated control system such as control system 606 of vehicle 600. Light emitting areas may be continuous or non-continuous having portions with different functions or orientations such may be suitable for the application.

Light emitting areas 611A, 611B and 611C may emit, transmit, or reflect light via lens area 612A, while light emitting area 611D may do so via lens area 612B and light emitting area 611E may do so via lens area 612C. Lens areas 612A, 612B and 612C may be made in part or in whole from glass or an injection molded polymer such as polycarbonate or any suitable material or process provided that at least a portion of it may be transparent, translucent, or reflective, or some combination thereof. Lens areas 612A, 612B and 612C may be continuous or non-continuous having portions with different functions, colors or orientations. For example, lens area 612A could partially comprise a red lens material generally facing backward such as for tail or brake lamps as well as partially comprise an amber lens material such as for marker or turn signal lamps facing both backward and sideward. For example, lens area 612B could at least partially comprise a clear or white lens material at least partially facing towards the vehicle, ground surface or loading area. Lens area 612C, for example, could partially comprise a clear or white lens material at least partially facing backwards such as for a backup lamp.

As used herein with reference to certain features, elements, components or structures, numerical ordinals (e.g., first, second, third, etc.) may be used to denote different singles of a plurality or otherwise identify certain features, elements, components or structures, and do not imply any order or sequence unless specifically defined by the claim language. Additionally, the terms "position," and the like, may be broadly interpreted. As such, the terms "position," and the like, may include a wide range of relative orientations that include, but may be not limited to, any depicted angular, linear or other orientation.

Further, the term "light emitting area" and the like, used herein, may be to include components for illumination such as light sources and components for limiting, dispersing or directing light such as reflectors, shields or diffusers as well as any other component known by those skilled in the art. Light emitting areas may include one or more light sources being, for example, incandescent lamps, light-emitting-diodes (LEDs), xenon lamps, high-intensity-discharge (HID) lamps, optic conductors or any suitable type, combination or arrangement. Reflectors may be separate components or integrated features into any air scoop light unit component and may be constructed of, for example, polished or plated metal stampings or optionally injection molded plastic components with reflective coatings or any suitable construction or material as may any shields and diffusers. Shields may be separate components or integrated features into any air scoop light unit component in order to block or limit light from a lamp. Diffusers may be separate components or integrated features into other components of the air scoop light unit in order to diffuse, disperse or otherwise direct light from a lamp.

Additionally, any light emitting area may include an operatively steady light source, wherein said light source may be generally continually illuminated during use, for example being one of a headlight, tail lamp, marker lamp, running lamp, driving lamp, fog lamp, cargo lamp, security lamp, decorative lamp, puddle lamp or spot lamp. And any light emitting area may include an operatively regulated light source, wherein said light source may be generally intermittently illuminated during use, for example being one of a turn signal lamp, cornering lamp, brake lamp, hazard lamp, backup lamp, decorative lamp, warning lamp or emergency lamp. Or a light emitting area may include one or more light sources capable of being both operatively steady and operatively regulated.

In addition, the term "signal" and the like, used herein, may broadly refer to any type intended for communication. Most commonly, electrical signals may be used as the working medium of many devices, such as those described herein, but could alternately utilize wireless, optic, hydraulic, pneumatic or any other signals or combination thereof. And the term "lead" and the like, used herein, may broadly refer to one or more conduits through which a signal may be communicated. Typically, conduits for electrical signals may be metallic wires or metallic contacts, conduits for wireless signals may be antennae, conduits for optics may be polymer conductors, conduits for hydraulics and pneumatics may be hollow tubing. However, it will be understood that any suitable media or conduit through which a signal may be communicated could alternately be used.

Furthermore, the phrase "flowed-material joint" and the like, used herein, may be interpreted to include any joint or connection in which a liquid or otherwise flowable material (e.g., a melted material or combination of melted materials) may be deposited, formed or otherwise presented between adjacent component parts and operative to form a fixed connection there between, including those which may be substantially fluid-tight. Examples of processes that may be used to form such a flowed-material joint include, without limitation, welding processes which use energy to melt material between adjacent component parts; as well as applying, depositing or otherwise presenting an adhesive between adjacent component parts. In such case, it will be appreciated that any suitable adhesive material or combination of materials may be used, such as one-part or two-part epoxies, for example.

In addition, the term "fastener" and the like, used herein, may be interpreted to include any feature or component which secures one or more components together. Such fasteners, for example, may be separate from other components such as, but not limited to, conventional clips, screws, washers or nuts; or integrated into other components such as, but not limited to, snap tabs, receiving ledges, bosses with internal or external threads, barbs or knurls, interference or loose fitting inter-engaging features; or any combination thereof.

Further still, the term "fluid" and the like, used herein, may broadly refer to any gaseous, vaporous or liquid medium. Most commonly, air may be used as the working medium of aerodynamic devices, such as those described herein. However, it will be understood that any suitable media through which a vehicle moves could alternately be used.

It will be recognized that numerous different features or components may be presented in the embodiments shown and described herein, and that no one embodiment may be specifically shown and described as including all such features and components. Accordingly, it is understood that the subject matter of the present disclosure may be intended to encompass any and all combinations of the different features and components that may be shown and described herein, and, without limitation, that any suitable arrangement of features and components, in any combination, may be used. Thus, it is distinctly understood that claims directed to any such combination of features or components, whether or not specifically embodied herein, may be intended to find support in the present disclosure.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air scoop light unit for a vehicle body comprising four exterior convex corner portions including a front left corner portion, a front right corner portion, a rear left corner portion, and a rear right corner portion, the air scoop light unit comprising:
a leading edge;
a trailing edge;
a curved body comprising a concave curved inner surface contoured to extend at least partially around the front left corner portion or the front right corner portion of the vehicle body, the concave curved inner surface being a concave guiding surface that extends from the leading edge to the trailing edge, the curved body further comprising a first light emitting area configured to direct light from a first light source housed within the curved body; and
a first connector portion configured to connect the concave curved inner surface with the front left corner portion or the front right corner portion of the vehicle body so as to hold the curved body in a location spaced apart from the front left corner portion or the front right corner portion of the vehicle body such that a curved airflow channel is formed between the front left corner portion or the front right corner portion of the vehicle body and the concave curved inner surface, in which the curved airflow channel is configured to guide airflow around the front left corner portion or the front right corner portion of the vehicle body when the air scoop light unit is attached with the vehicle body and the vehicle body moves through air during use.

2. The air scoop light unit of claim 1, further comprising a second connector portion configured to connect the concave curved inner surface with the front left corner portion or the front right corner portion of the vehicle body so as to hold the curved body in a location spaced apart from the front left corner portion or the front right corner portion of the vehicle body by a first distance such that a curved airflow channel is formed between the front left corner portion or the front right corner portion of the vehicle body and the concave curved inner surface, in which the curved airflow channel is configured to guide airflow around the front left corner portion or the front right corner portion of the vehicle body when the air scoop light unit is attached with the vehicle body and the vehicle body moves through air during use.

3. The air scoop light unit of claim 2, wherein the curved body extends in the vertical direction, when installed on the vehicle body, from an upper portion to a lower portion, and the first connector portion is configured to connect an upper portion of the concave curved inner surface with the front left corner portion or the front right corner portion of the vehicle body and the second connector portion is configured to connect a lower portion of the concave curved inner surface with the front left corner portion or the front right corner portion of the vehicle body, such that the first and second connector portions are configured to form upper and lower walls, respectively, of the curved airflow channel that is formed between the front left corner portion or the front right corner portion of the vehicle body and the concave curved inner surface when the air scoop light unit is installed on the vehicle body.

4. The air scoop light unit of claim 3, wherein the curved body is a unitary structure that comprises the first and second connector portions.

5. The air scoop light unit of claim 1, wherein the curved body is formed at least in part from translucent material.

6. The air scoop light unit of claim 5, wherein the curved body is formed substantially entirely from translucent material.

7. The air scoop light unit of claim 1, wherein the first light emitting area is positioned to direct light toward at least a portion of the vehicle.

8. The air scoop light unit of claim 1, wherein the first light source is mounted with the curved body.

9. The air scoop light unit of claim 1, the curved body further comprising a second light emitting area configured to direct light from a second light source housed within the curved body.

10. The air scoop light unit of claim 1, wherein the first light source comprises a vehicle headlight.

11. The air scoop light unit of claim 1, wherein the first light source comprises a vehicle turn signal light.

12. A vehicle, comprising:
a vehicle body having four exterior convex corner portions including a front left corner portion, a front right corner portion, a rear left corner portion, and a rear right corner portion; and
a first air scoop light unit attached with a first one of the four exterior convex corner portions of the vehicle body, the first air scoop light unit comprising:
a leading edge;
a trailing edge;
a curved body comprising a concave curved inner surface contoured to extend at least partially around the first one of the four exterior convex corner portions of the vehicle body, the concave curved inner surface being a concave guiding surface that extends from the leading edge to the trailing edge, the curved body further comprising a first light emitting area configured to direct light from a first light source;
a first connector portion connecting the concave curved inner surface with said first one of the four exterior convex corner portions of the vehicle body so as to hold the curved body in a location spaced apart from said first one of the four exterior convex corner portions of the vehicle body such that a curved airflow channel is formed between said first one of the four exterior convex corner portions of the vehicle body and the concave curved inner surface, in which the curved airflow channel is configured to guide airflow around said first one of the four exterior convex corner portions of the vehicle body when the vehicle body moves through air during use; and
a second air scoop light unit attached with a second one of the four exterior convex corner portions of the vehicle body, the second air scoop light unit comprising:
a leading edge;
a trailing edge;
a curved body comprising a concave curved inner surface contoured to extend at least partially around the second one of the four exterior convex corner portions of the vehicle body, the concave curved inner surface being a concave guiding surface that extends from the leading edge to the trailing edge, the curved body further comprising a second light emitting area configured to direct light from a second light source; and a second connector portion connecting the concave curved inner surface with said second one of the four exterior convex corner portions of the vehicle body so as to hold the curved body in a location spaced apart from said second one of the four exterior convex corner portions of the vehicle body such that a curved airflow channel is formed between said second one of the four exterior convex corner portions of the vehicle body and the concave curved inner surface, in which the curved airflow channel is configured to guide airflow around said second one of the four exterior convex corner portions of the vehicle body when the vehicle body moves through air during use, wherein the first one of the four exterior convex corner portions of the vehicle body is the front left corner portion and the second one of the four exterior convex corner portions of the vehicle body is the front right corner portion.

13. The vehicle of claim 12, the vehicle body further comprising a third air scoop light unit attached with a third one of the four exterior convex corner portions of the vehicle body, the third air scoop light unit comprising:

a leading edge;

a trailing edge;

a curved body comprising a concave curved inner surface contoured to extend at least partially around the third one of the four exterior convex corner portions of the vehicle body, the concave curved inner surface being a concave guiding surface that extends from the leading edge to the trailing edge, the curved body further comprising a third light emitting area configured to direct light from a third light source; and a third connector portion connecting the concave curved inner surface with said third one of the four exterior convex corner portions of the vehicle body so as to hold the curved body in a location spaced apart from said third one of the four exterior convex corner portions of the vehicle body such that a curved airflow channel is formed between said third one of the four exterior convex corner portions of the vehicle body and the concave curved inner surface, in which the curved airflow channel is configured to guide airflow around said third one of the four exterior convex corner portions of the vehicle body when the vehicle body moves through air during use.

14. The vehicle of claim 13, the vehicle body further comprising a fourth air scoop light unit attached with a fourth one of the four exterior convex corner portions of the vehicle body, the fourth air scoop light unit comprising:

a leading edge;

a trailing edge;

a curved body comprising a concave curved inner surface contoured to extend at least partially around the fourth one of the four exterior convex corner portions of the vehicle body, the concave curved inner surface being a concave guiding surface that extends from the leading edge to the trailing edge, the curved body further comprising a fourth light emitting area configured to direct light from a fourth light source; and a fourth connector portion connecting the concave curved inner surface with said fourth one of the four exterior convex corner portions of the vehicle body so as to hold the curved body in a location spaced apart from said fourth one of the four exterior convex corner portions of the vehicle body such that a curved airflow channel is formed between said fourth one of the four exterior convex corner portions of the vehicle body and the concave curved inner surface, in which the curved airflow channel is configured to guide airflow around said fourth one of the four exterior convex corner portions of the vehicle body when the vehicle body moves through air during use.

15. The vehicle of claim 12, wherein the first connector portion connects the concave curved inner surface with said first one of the four exterior convex corner portions of the vehicle body so as to hold the curved body in a location spaced apart from said first one of the four exterior convex corner portions of the vehicle body by a first distance; and wherein the vehicle body comprises an exterior profile that extends longitudinally from a front region comprising the front left corner portion and the front right corner portion, to a central body portion having a first cross-sectional width, to a rear portion comprising the rear left corner portion and the rear right corner portion, wherein the vehicle body tapers inward as it extends away from the central portion such that the rear portion has a second cross-sectional width that is narrower than the first cross-sectional width by an amount equal to at least twice the first distance.

* * * * *